(12) United States Patent
Vilaipornsawai et al.

(10) Patent No.: US 10,652,851 B2
(45) Date of Patent: May 12, 2020

(54) UPLINK-BASED USER EQUIPMENT TRACKING FOR CONNECTED INACTIVE STATE

(71) Applicants: Usa Vilaipornsawai, Nepean (CA); Mohammadhadi Baligh, Ottawa (CA); Keyvan Zarifi, Ottawa (CA); Yicheng Lin, Ottawa (CA)

(72) Inventors: Usa Vilaipornsawai, Nepean (CA); Mohammadhadi Baligh, Ottawa (CA); Keyvan Zarifi, Ottawa (CA); Yicheng Lin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/789,650

(22) Filed: Oct. 20, 2017

(65) Prior Publication Data

US 2018/0124733 A1 May 3, 2018

Related U.S. Application Data

(60) Provisional application No. 62/417,227, filed on Nov. 3, 2016.

(51) Int. Cl.
*H04W 64/00* (2009.01)
*H04W 52/02* (2009.01)
*H04W 76/27* (2018.01)

(52) U.S. Cl.
CPC ....... *H04W 64/00* (2013.01); *H04W 52/0216* (2013.01); *H04W 52/0229* (2013.01);
(Continued)

(58) Field of Classification Search
CPC . H04W 64/00; H04W 76/27; H04W 52/0216; H04W 52/0229; Y02D 70/24; Y02D 70/00; Y02D 70/23; Y02D 70/1262
(Continued)

(56) References Cited

U.S. PATENT DOCUMENTS

2012/0163320 A1\* 6/2012 Akimoto ............... H04L 5/0051
370/329
2013/0077569 A1\* 3/2013 Nam ................... H04W 52/288
370/328
(Continued)

FOREIGN PATENT DOCUMENTS

| CN | 104812057 A | 7/2015 |
| CN | 104854949 A | 8/2015 |
| EP | 3468265 A1 | 4/2019 |

OTHER PUBLICATIONS

R3-161839 Huawei,"UE centric design for NR",3GPP TSG-RAN WG3 Meeting #93,Gothenburg, Sweden, Aug. 22-26, 2016,total 2 pages.
(Continued)

*Primary Examiner* — Mong-Thuy T Tran

(57) ABSTRACT

Methods and devices for uplink-based User Equipment (UE) tracking for UEs operating in a connected inactive operating state are provided. A transmit-receive point (TRP) transmits parameters to a UE that allow the UE to uniquely determine a UE-specific tracking sequence and assigned time-frequency (TF) resource that are independent of a TRP identifier associated with the TRP. The UE determines the UE-specific tracking sequence and assigned TF resource based at least in part on the parameters received from the TRP. While in the connected inactive operating state, the UE transmits a tracking signal that includes the UE-specific tracking sequence in accordance with the assigned TF resource. The TRP receives the tracking signal from the UE, detects the UE in accordance with the UE-specific tracking sequence to produce a UE detection status, and transmits a tracking response to the UE in accordance with the UE detection status.

24 Claims, 17 Drawing Sheets

(52) U.S. Cl.
CPC ............ *H04W 76/27* (2018.02); *Y02D 70/00* (2018.01); *Y02D 70/1262* (2018.01); *Y02D 70/23* (2018.01); *Y02D 70/24* (2018.01)

(58) Field of Classification Search
USPC ........................................................ 370/329
See application file for complete search history.

(56) References Cited

U.S. PATENT DOCUMENTS

| | | | | |
|---|---|---|---|---|
| 2013/0315152 | A1* | 11/2013 | Ratasuk | H04W 76/14 370/329 |
| 2014/0036737 | A1* | 2/2014 | Ekpenyong | H04W 8/245 370/280 |
| 2014/0044088 | A1* | 2/2014 | Nogami | H04J 11/0069 370/329 |
| 2014/0086176 | A1 | 3/2014 | Liu et al. | |
| 2014/0119321 | A1* | 5/2014 | Wang | H04L 5/0048 370/329 |
| 2014/0293918 | A1* | 10/2014 | Vujcic | H04W 74/0866 370/329 |
| 2015/0181546 | A1* | 6/2015 | Freda | H04W 56/0015 370/336 |
| 2016/0294514 | A1* | 10/2016 | Tang | H04W 4/70 |
| 2016/0295633 | A1 | 10/2016 | Baligh et al. | |
| 2017/0034812 | A1* | 2/2017 | Deng | H04W 72/046 |
| 2017/0331577 | A1* | 11/2017 | Parkvall | H04L 5/0053 |
| 2018/0220462 | A1* | 8/2018 | Kusashima | H04W 16/14 |
| 2019/0020451 | A1* | 1/2019 | Zhang | H04B 7/0452 |

OTHER PUBLICATIONS

R2-166987 Huawei et al.,"Benefit of UL tracking",3GPP TSG-RAN WG2 Meeting #95b1s,Kaohsiung, Oct. 10-14, 2016,total 7 pages.

* cited by examiner

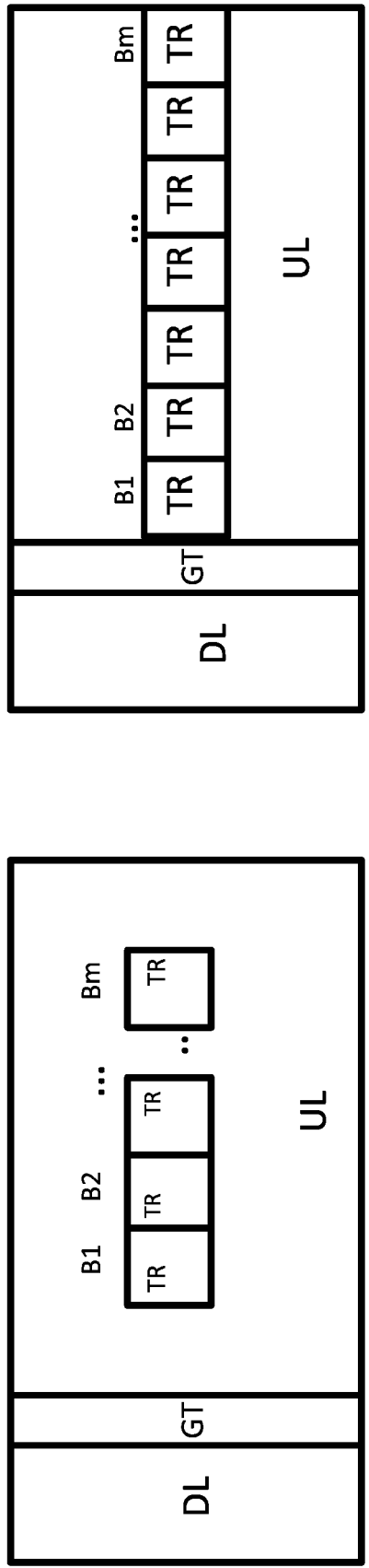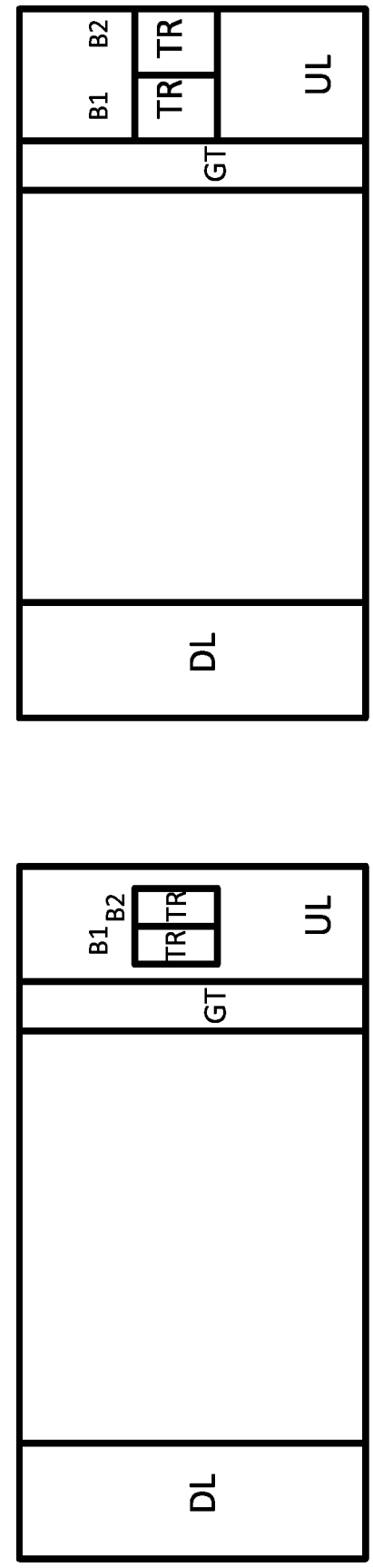
FIG. 7

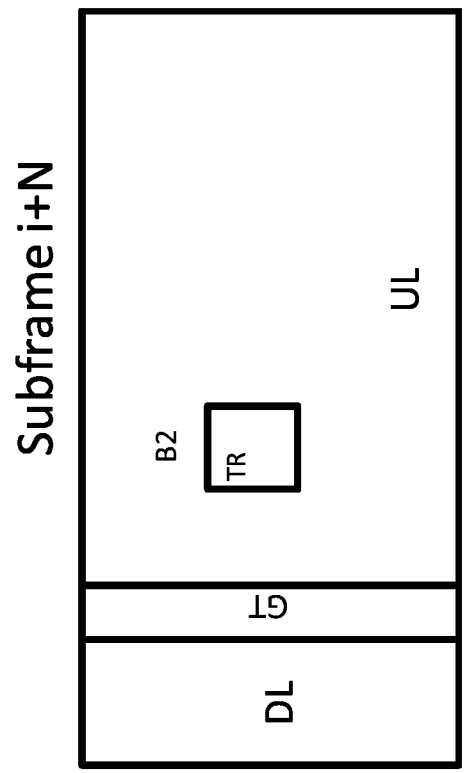
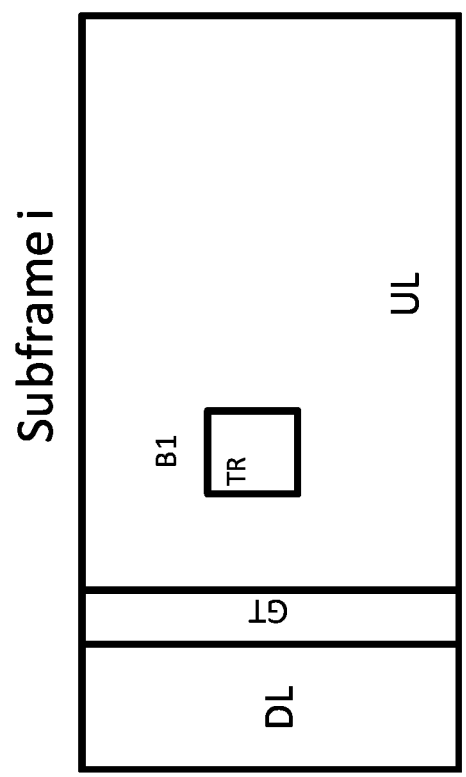
FIG. 8

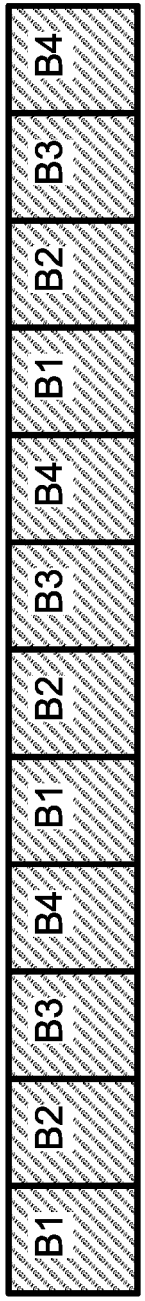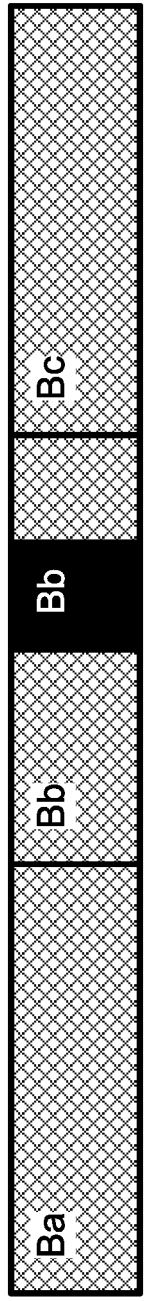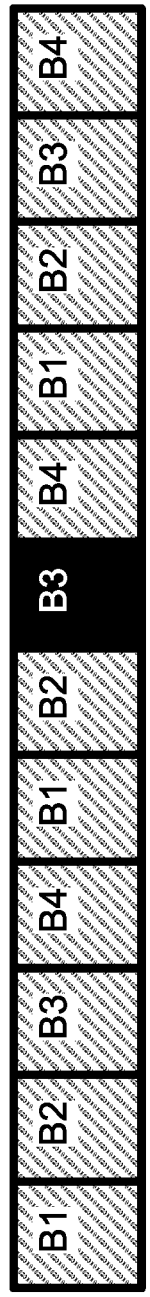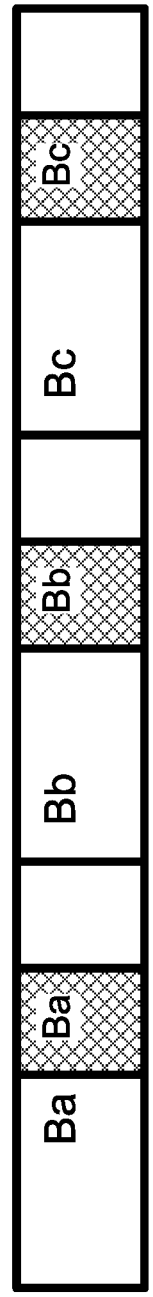
FIG. 11

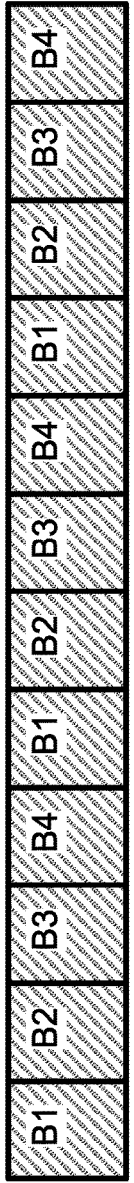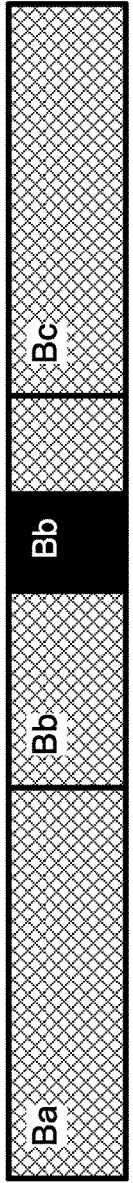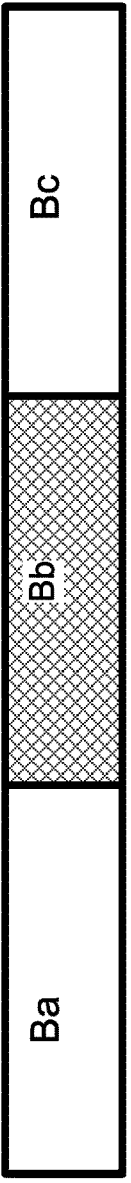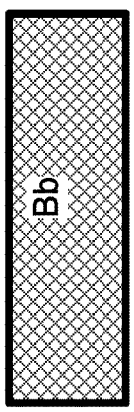
FIG. 12

UPLINK-BASED USER EQUIPMENT TRACKING FOR CONNECTED INACTIVE STATE

CROSS-REFERENCE TO RELATED APPLICATION

This application claims the benefit of U.S. Provisional Patent Application No. 62/417,227 entitled "Uplink-Based User Equipment Tracking for Connected Inactive State" filed Nov. 3, 2016, the entire content of which is incorporated herein by reference.

FIELD

The present disclosure relates generally to wireless communications and, in particular, to user equipment tracking and associated methods and apparatus.

BACKGROUND

A User Equipment (UE) in a wireless communication system may have multiple operating modes, including an active operating mode and a standby operating mode. In an active operating mode, all UE functions are available, and the UE may be transmitting or receiving communication signals or otherwise being used by a user, for example. A standby operating mode in which at least some UE functions are disabled could be useful for conserving power, for example, but requires a connection to the wireless communication system to be established or re-established before communication signals can be transmitted or received.

In current Long Term Evolution (LTE) systems, for instance, UEs have a Radio Resource Control (RRC) idle mode as a standby operating mode. When downlink (DL) data is to be transmitted to a UE by a network element in a communication system or uplink (UL) data is to be transmitted by a UE to a network element, a connection establishment procedure must be completed in order for the UE to transition from the RRC idle mode to an RRC connected mode, before data transmission and/or reception can begin.

SUMMARY

According to a first aspect, the present disclosure provides a method that includes transmitting, from a transmit-receive point (TRP) in a communication network to a UE, parameters that allow the UE to uniquely determine a UE-specific tracking sequence and assigned time-frequency (TF) resource. The UE-specific tracking sequence and assigned TF resource may be independent of a transmit-receive point identifier (TRP ID) associated with the TRP. The method further includes receiving, at the TRP from the UE operating in a connected inactive operating mode, a tracking signal that includes the UE-specific tracking sequence in accordance with the assigned TF resource.

In some embodiments, the method may further include the TRP detecting the UE in accordance with the UE-specific tracking sequence to produce a UE detection status. The TRP may then transmit, to the UE, a tracking response in accordance with the UE detection status.

In some embodiments, the tracking response comprises at least one of timing advance information and power control information.

In some embodiments, detecting the UE comprises jointly detecting the UE with at least one other TRP.

In some embodiments, transmitting parameters that allow the UE to uniquely determine the UE-specific tracking sequence and assigned TF resource comprises transmitting one or more of the following: a UE identifier (ID) associated with the UE; a seed value for a pseudo random number generator; a hyper cell ID associated with a hyper cell that is associated with the UE; and a security key.

In some embodiments, the method further includes: determining a cyclic shift; determining a root; and mapping the cyclic shift and the root to the UE ID. In some cases, the UE ID may include one or more of a UE type, a zone, location information, and an identifier.

In some embodiments, the method further includes transmitting, from the TRP to the UE, information indicating an assigned tracking signal format that is one of a plurality of different tracking signal formats. The TRP may then monitor for a tracking signal from the UE that has the assigned tracking signal format.

In some embodiments, the method further includes the TRP selecting the assigned tracking signal format from among the plurality of different tracking signal formats based in part on at least one of: a deployment scenario; a characteristic of the UE; a target tracking performance criterion; a frame structure; uplink/downlink duplexing strategy. The different tracking signal formats may differ in terms of one or more of: signal bandwidth; tracking sequence length; cyclic prefix; guard time; numerologies.

In some embodiments, the method further includes the TRP transmitting, to another UE, parameters that allow the other UE to uniquely determine another UE-specific tracking sequence and assigned TF resource. For example, the two UEs may be in the same hyper cell. In some cases, the two UE-specific tracking sequences for the two UEs may be non-orthogonal.

In some embodiments, the UE-specific tracking sequences are Zadoff-Chu sequences.

In some embodiments, the connected inactive operating mode supports UE maintaining its connection to the network without constantly monitoring a control channel.

According to a second aspect, the present disclosure provides a TRP that includes a memory storage that includes instructions, and one or more processors in communication with the memory storage, wherein the one or more processors execute the instructions to implement a method according to the first aspect of the present disclosure.

According to a third aspect, the present disclosure provides a method that includes a UE receiving, from a TRP in a communication network, parameters for allowing the UE to uniquely determine a UE-specific tracking sequence and assigned TF resource that are independent of a transmit-receive point identifier (TRP ID) associated with the TRP. The UE may then determine the UE-specific tracking sequence and assigned TF resource based at least in part on the parameters received from the TRP. While operating in a connected inactive operating mode, the UE may transmit a tracking signal that includes the UE-specific tracking sequence in accordance with the assigned TF resource.

In some embodiments, the method further includes the UE receiving, from the TRP, a tracking response after transmitting the tracking signal. The tracking response may include time advance information and/or power control information.

In some embodiments, transmitting the tracking signal in the connected inactive operating mode includes transmitting the tracking signal periodically, on demand, or a combination thereof.

In some embodiments, determining the UE-specific tracking sequence and assigned TF resource includes determining the UE-specific tracking sequence and assigned TF resource based at least in part on one or more of the following: a UE ID associated with the UE; a seed value for a pseudo random number generator; a hyper cell ID associated with a hyper cell that is associated with the UE; a security key.

In some embodiments, the method further includes identifying at least one uplink (UL) receive (Rx) antenna beam of the TRP based on: a known reciprocity of the TRP; and at least one downlink (DL) transmission (Tx) antenna beam of the TRP that the UE previously identified as being the Tx side of an optimal beam pair link (BPL) for DL reception. In such embodiments, the UE may transmit the tracking signal from the UE operating in the connected inactive operating mode comprises sequentially transmitting the tracking signal on each UL Tx antenna beam of the UE when the TRP is scheduled to listen on the at least one identified UL Rx antenna beam.

In some embodiments, there may be a mapping between TF resources for UL tracking signal transmission and DL Tx antenna beams. A UE may use this mapping when sequentially transmitting the tracking signal on each of its UL Tx antenna beams of the UE when the TRP is scheduled to listen on the at least one identified UL Rx antenna beam. For example, the UE may sequentially transmit the tracking signal on the TF resource(s) corresponding to the at least one DL Tx antenna beam of the TRP that the UE previously identified as being the Tx side of an optimal BPL for DL reception.

According to a fourth aspect, the present disclosure provides a UE that includes a memory storage that includes instructions, and one or more processors in communication with the memory storage, wherein the one or more processors execute the instructions to implement a method according to the third aspect of the present disclosure.

BRIEF DESCRIPTION OF THE DRAWINGS

FIG. 7 is a block diagram illustrating examples of TDD subframes that include multiple tracking signal resources located within the UL portion of the TDD subframes to support the repeated transmission of a tracking signal for different beam directions according to an embodiment of the present disclosure.

FIG. 8 is a block diagram illustrating an example of two TDD subframes i and i+N that each include a single tracking signal resource located within the UL portion of the subframe to support the repeated transmission of a tracking signal for different beam directions according to an embodiment of the present disclosure.

FIG. 11 shows an example of UL beam sweeping and DL beam sweeping performed by a UE and a TRP according to another embodiment of the present disclosure.

FIG. 12 shows an example of UL beam sweeping and DL beam sweeping performed by a UE and a TRP according to yet another embodiment of the present disclosure.

DETAILED DESCRIPTION

Figure 1:
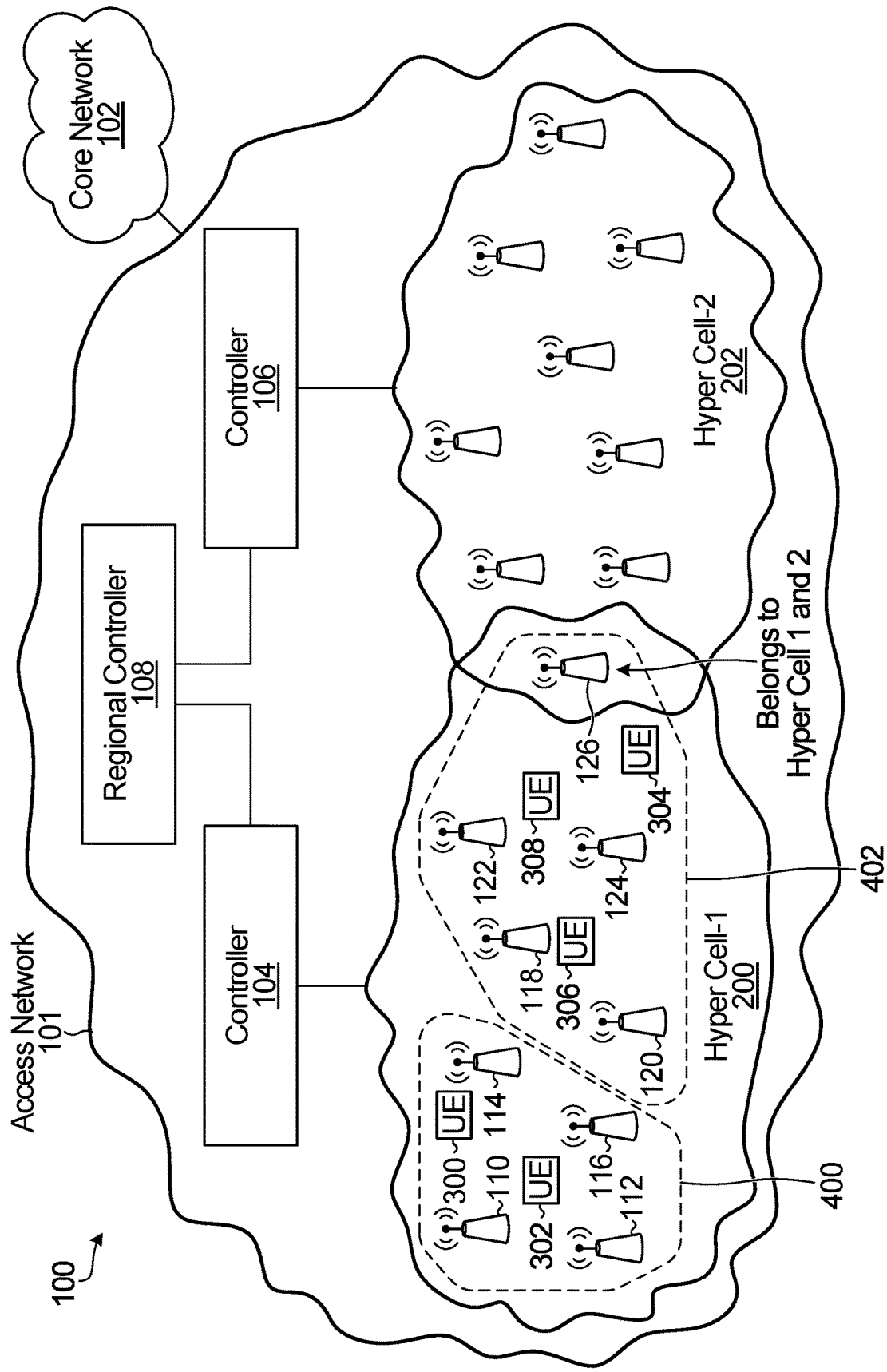
FIG. 1 is a block diagram of a communications network according to an embodiment of the present disclosure.

Generally, embodiments of the present disclosure provide methods and apparatus for uplink-based UE tracking. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Turning now to the figures, some specific example embodiments will be described.

FIG. 1 is a diagram illustrating a communication system in accordance with one embodiment. The communication system 100 includes an access network 101 and a core network 102.

The core network 102 may provide any of various services, such as call control/switching and gateways to other networks. The core network 102 includes network components such as routers, switches, and servers.

The access network 101 is an example of a hyper cell based wireless communication access network, and is connected or coupled to the core network 102. As shown in FIG. 1, the access network 101 includes two hyper cells 200, 202. The access network 101 is an example of a network design similar to that of many proposed future network designs, such as those that have been proposed for the fifth generation (5G) or new radio (NR) wireless networks. Each hyper cell 200, 202 has a respective controller 104,106 connected to a regional controller 108. Each hyper cell is a logical entity that covers a group of physical network elements. A hyper cell may have a configurable coverage area according to network topology, UE distribution and load distribution, for example, and may overlap with a neighboring hyper cell. In the illustrated example, hyper cell 200 has network elements 110, 112, 114, 116, 118, 120, 124, 126. Hyper cell 202 also has a group of network elements, including the network element 126 that also belongs to hyper cell 200. A hyper cell contains many network elements that may be of different types including, for example, macro cells, pico cells, remote radio heads (RRH), transmit-receive points (TRPs), and evolved NodeBs (eNBs). It is understood that the group of physical network elements associated with each hyper cell may include at least one network element. It is also understood alternate implementations are contemplated by this disclosure, e.g., where the controllers 104,106 may be integrated into the controller 108 or the corresponding network elements.

The network elements provide wireless communication service within respective wireless coverage areas. Each network element, for example, may be implemented using a radio transceiver, one or more antennas, and associated processing circuitry, such as antenna radio frequency (RF) circuitry, analog-to-digital/digital-to-analog converters, etc.

UEs 300, 302, 304, 306, 308 wirelessly access the communication system 100 using the access network 101. Each UE 300-308, for example, includes a radio transmitter and a radio receiver which may be integrated into a radio transceiver, one or more antennas, and associated processing circuitry, such as antenna radio frequency (RF) circuitry, analog-to-digital/digital-to-analog converters, etc. Network elements and the UEs may include similar types of components to support communications with each other in the communication system 100, but the actual implementations may be different. For example, UEs are typically portable between locations, whereas network elements are typically intended to be installed at a fixed location.

The network elements, in some implementations, may serve as a gateway between wireline and wireless portions of the access network 101, although this need not be the case in embodiments in which the communication links between the network elements and controllers 104,106 are wireless communications links. The network elements may be placed at fixed locations by a network provider, for example, to provide a substantially continuous wireless coverage area. This is shown in FIG. 1 in that the coverage areas of hyper cells 200, 202 overlap each other so that UEs 300-308 may move throughout the hyper cells and still be served by the access network 101. A hyper cell identifier (ID) is a logical entity ID that may be assigned to a hyper cell. A UE accesses the network and obtains the hyper cell ID.

In some implementations, multiple network elements may serve an individual UE as a cooperative multi-point (CoMP) serving set that acts as a virtual network element, e.g. a virtual transmission-reception point (VTRP), for communication with the UE. This is shown in FIG. 1 in that UEs 300 and 302 are served by a CoMP serving set 400 that includes network elements 110, 112, 114, 116 and UEs 304, 306, 308 are served by a CoMP serving set 402 that includes network elements 118, 120, 122, 124, 126. The network elements serving a UE within a CoMP serving set may jointly detect transmissions from the UE and/or jointly transmit signals to the UE. It is expressly understood that alternate implementations are contemplated by this disclosure, e.g., where any number of UEs may be serviced by a CoMP serving set.

Under certain conditions, a UE 300-308 could transition from an active operating mode or state to a standby operating mode or state. For example, a UE 300-308 could transition to a standby operating mode after a time period of inactivity, during which limited communication signals were received or transmitted by the UE and the UE was not otherwise in use by a user. The UE 300-308 could transition to a standby operating mode after a time period of reduced activity, or activity below a threshold level. The standby operating mode allows the UE to conserve battery power and thereby extend battery life, for example. Although limited communication functions may be supported in the standby operating mode, a UE 300-308 transitions from the standby operating mode to the active operating mode before full communication functions are restored. RRC idle state is an example of a standby operating mode.

In accordance with embodiments disclosed herein, a UE has a connected inactive operating mode, in addition to or instead of a standby operating mode that requires re-connection to an access network. In a connected inactive operating mode, UE context and identifier information could be maintained by a network element or other component of the access network, to enable a simplified transition procedure for the UE to transition from the connected inactive operating mode to the active operating mode. A UE in the connected inactive operating mode could be involved in maintaining its connection to the access network, by transmitting tracking information and/or other information to a network element for example. Moreover, in some cases, the UE in the connected inactive operating mode may maintain its connection to the access network without constantly monitoring the control channel.

It is understood that the term "operating mode" generally is used interchangeably with the term "state" or "mode" herein, although in some instances they may be used with different scope from each other, as will be evident from the context in which the terms are used. The term "connected inactive" generally is used interchangeably with the term "inactive" herein, although in some instances they may be used with different scope from each other, as will be evident from the context in which the terms are used.

Consider New Radio (NR), for example, in which a new UE "connected inactive" mode or state is defined in addition to an active mode or state and an idle mode or state. In this new mode, the UE context and ID are preserved; and signaling, power consumption, and resource utilization are reduced. Such a new operating mode may involve new procedures such as new tracking schemes. Examples herein refer to NR and tracking, but these examples are intended solely for illustrative and non-limiting purposes.

In NR, it is possible that uplink (UL) based measurement can be configured for the UE either in connected inactive or active states for the purpose of long-term UE-TRP association, UE position tracking, network-controlled mobility handling and even time alignment.

In NR, uplink tracking signals should also be configured for UEs that are in a connected inactive state. In the connected inactive state, a UE can be UL time aligned coarsely or finely or not time aligned at all with the network. Providing a tracking mechanism in the connected inactive state would allow for the network to continue keeping track of the locations of the UEs, allowing efficient paging, maintaining uplink timing alignment and determining UE-TRP association.

The present disclosure provides a new uplink tracking signal design that is configurable to meet requirements of NR, such as coverage, numerology, frame structure, and network structure, with the possible incorporation of hypercells.

In some embodiments of the present disclosure, tracking sequences are configured so that they have good auto- and cross-correlation properties. Zadoff-Chu (ZC) sequences are an example of sequences that are configurable to provide such properties.

In some embodiments of the present disclosure, tracking signals are transmitted in a tracking signal resource that includes a tracking sequence, a cyclic prefix (CP), guard time (GT) and guard bands (GBs). The GT and GBs may only be used in embodiments where the numerology (e.g. subcarrier spacing (SCS)) used within the tracking signal resource is different than the numerology used for UL data and control signals, as discussed in further detail later on.

Multiple tracking signal formats with different configurable parameters (e.g. CP, GT, sequence duration, sequence BW, sequence length, numerology) may be used to accommodate different scenarios and/or UE conditions. For example, in some embodiments, different tracking signal formats differ in terms of at least one of the following parameter: signal bandwidth (BW), sequence duration, sequence length, CP, GT, and numerologies. Tracking signals may be adapted for transmission in different subframe configurations including, but not limited to, a symbol bundling configuration, a Frequency Division Duplexing (FDD) configuration, a Time Division Duplexing (TDD) configuration (e.g., a self-contained TDD subframe having both downlink and uplink portions).

In some embodiments, the tracking signal format can be configured by high layer signaling and can change semi-statically. For example, in some embodiments, the tracking signal format may be changed to accommodate:

Different timing advance (TA) mechanisms (e.g., no TA, coarse TA, fine TA).

Different deployment scenarios, e.g., large cell size may require larger CP/GT, and sequence duration for coverage performance whereas dense urban deployments may not need TA and only small CP/GT is required.

Different UEs' requirements/conditions, e.g. high speed UEs may use larger subcarrier spacing. UEs with limited power can only use small BW tracking signals.

Different target tracking performance.

Different frame structures, e.g. to fit in UL portion of self-contained subframe.

FDD/TDD.

In some embodiments, the tracking signal sequence and the associated time-frequency (TF) resource assigned to a UE to generate a tracking signals are UE-specific, and are configurable.

In general, a tracking signal only needs to permit the network to identify the UE and determine which network elements, e.g. TRPs, best serve the UE. As such, the measurement of the tracking signal may not be as subject to as high a reliability requirement as the measurement of UL sounding reference signals (SRSs) that are transmitted by UEs in the active state for link adaptation. Accordingly, in some embodiments narrow-band signals are used for tracking signals. Furthermore, in some embodiments, the tracking signal only includes a tracking sequence, because it may not be necessary for the tracking signal to carry any messages to identify the UE to the network. The tracking sequence together with the TF resource in which the tracking signal is transmitted can be used to identify the UE, without explicitly sending the UE's identity to the network as part of the tracking signal. In other embodiments, the tracking signal carries other information in addition to the tracking sequence, e.g., information that explicitly identifies the UE, such as a UE identifier.

In some embodiments, tracking signals are configured so that they incur low power consumption, which can be achieved by using, e.g., a narrow-band signal, a signal with low Cubic Metric (CM)/Peak to Average Power Ratio (PAPR), or a low periodicity.

In some embodiments, tracking signals are configured so that they incur low overhead/signalling, which can also be achieved by using low periodicity.

In some embodiments, the tracking signals are configurable to support a large number of UEs, because there are likely to be more UEs in an inactive state than in active state.

Some embodiments include a power control mechanism for tracking signal transmission. For example, the transmission power with which a UE transmits its tracking signal may be adjusted based on tracking signal response(s) that the UE may receive from the network after it transmits its tracking signal.

Figure 2:
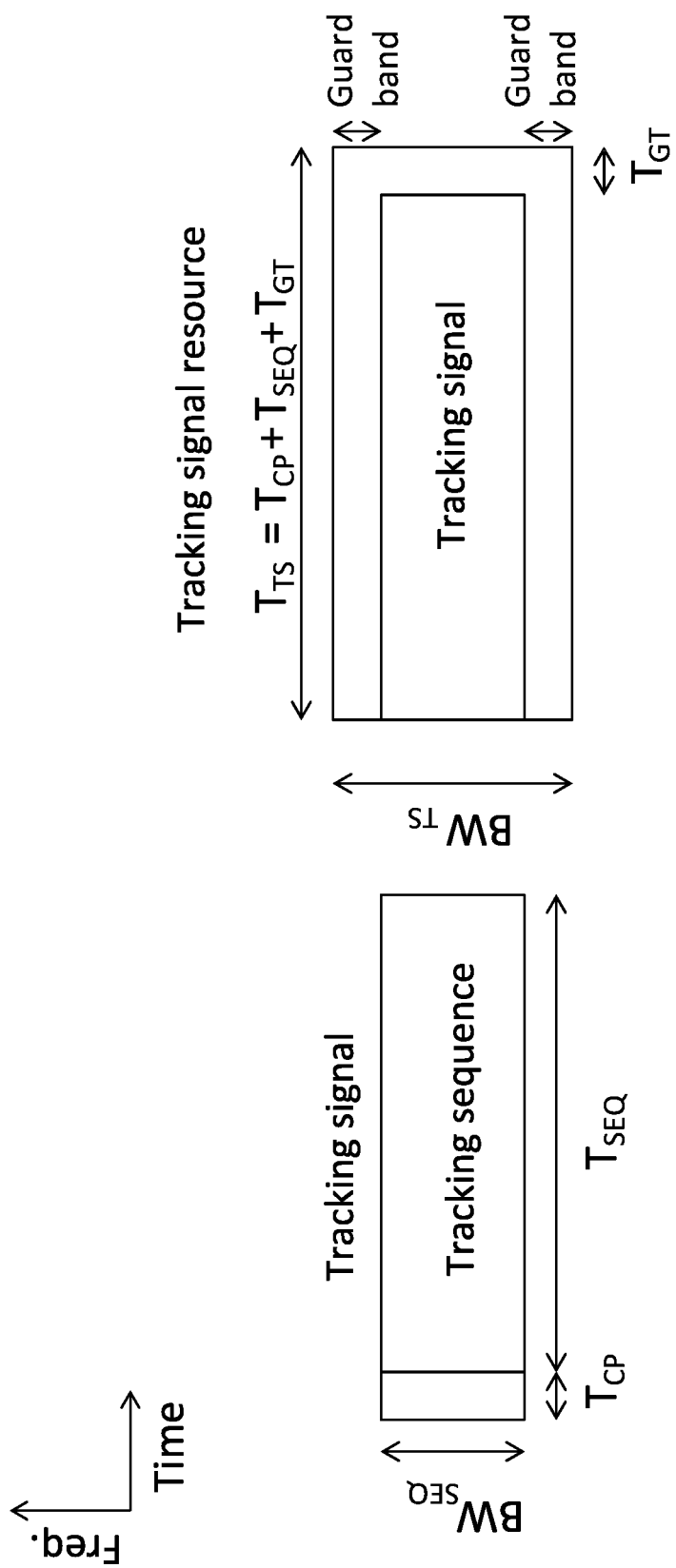
FIG. 2 is a block diagram illustrating examples of a tracking sequence and tracking signal resource in accordance with an embodiment of the present disclosure.

FIG. 2 is a block diagram illustrating examples of a tracking sequence and tracking signal resource in accordance with an embodiment of the present disclosure. The tracking signal includes a cyclic prefix of duration $T_{CP}$ followed by a tracking sequence of duration $T_{SEQ}$. The tracking signal has a bandwidth of $BW_{SEQ}$. The tracking signal resource within which the tracking signal is transmitted includes the tracking signal with guard bands in the frequency domain and a guard time of duration $T_{GT}$ appended to the end of the tracking signal. The bandwidth of the tracking signal resource is BWTS, which is equal to $BW_{SEQ}$+the bandwidths of the guard bands. The tracking signal resource has a duration of $T_{TS}=T_{CP}+T_{SEQ}+T_{GT}$.

Tracking Signal Structure

FIG. 2 is a block diagram illustrating examples of a tracking sequence and tracking signal resource in accordance with an embodiment of the present disclosure. The tracking signal includes a cyclic prefix of duration $T_{CP}$ followed by a tracking sequence of duration $T_{SEQ}$. The tracking signal has a bandwidth of $BW_{SEQ}$. The tracking signal resource within which the tracking signal is transmitted includes the tracking signal with guard bands in the frequency domain and a guard time of duration $T_{GT}$ appended to the end of the tracking signal. The bandwidth of the tracking signal resource is BWTS, which is equal to $BW_{SEQ}$+the bandwidths of the guard bands. The tracking signal resource has a duration of $T_{TS}=T_{CP}+T_{SEQ}+T_{GT}$.

As noted above, in order to be able to differentiate between tracking sequences, tracking sequences with good autocorrelation and cross correlation properties may be used, e.g. ZC sequences. The duration and BW of tracking sequences affect the pool size of sequences that are available for assignment.

For example, if a duration ($T_{SEQ}$) longer than one data symbol is used, then a subcarrier spacing can be used for the tracking sequence that is smaller than the subcarrier spacing used for data, thereby increasing the number of subcarriers within a given bandwidth (BW). With a longer $T_{SEQ}$, more orthogonal cyclic time shifted sequences can be accommodated by the longer duration. In addition, the smaller subcarrier spacing means that longer sequences (in # subcarriers for a given BW) can be used, which in turn means that more base sequences (sequences of the same length with different roots) are available. However, the use of smaller subcarrier spacing may be problematic for high speed UEs due to the Doppler spread that may be experienced by UEs moving at high speeds.

Increasing the tracking BW means that longer sequences can be used, which in turn means that more base sequences are available, as discussed above. However, transmitting the tracking signal across a wider bandwidth may require more power.

The cyclic prefix and guard time are used to account for propagation delay, timing mismatch and channel delay spread for different UEs at different locations in the network. Longer $T_{CP}$ and $T_{GT}$ may be needed in case of no or coarse TA and/or large timing mismatch. With fine TA and small timing mismatch, shorter $T_{CP}$ and $T_{GT}$ may be used, or $T_{GT}$ can be omitted if the cyclic prefix of the following symbol can absorb the expected delay spread.

Guard bands are not needed in all situations. For example, guard bands may only be needed in situations where UEs have no or coarse time alignment with the network and/or in situations where numerologies different from the numerologies used for data/control channels are used for tracking signals. Guard bands may be omitted in some situations, for example when fine is used TA and where the same numerology as data/control channels is used for tracking signals.

Figure 3:
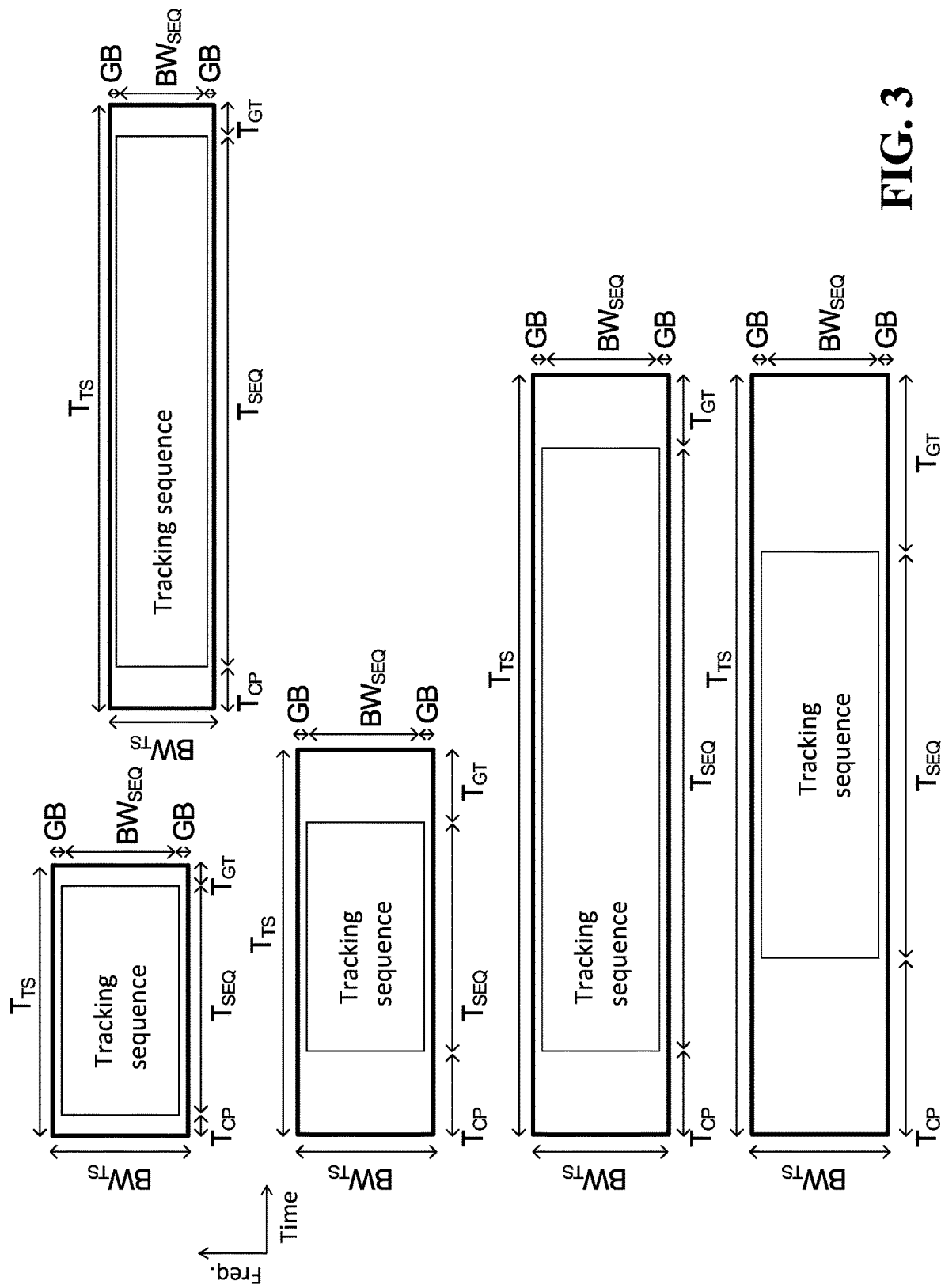
FIG. 3 is a block diagram illustrating examples of different tracking signal structures within different tracking signal resources according to an embodiment of the present disclosure.

FIG. 3 shows examples of different tracking signal structures within different tracking signal resources. Each example differs from the others in terms of at least one of $BW_{SEQ}$, $T_{CP}$, $T_{SEQ}$, $T_{GT}$, GB, or $T_{TS}$. These examples, as well as the example in FIG. 2, are illustrative of different tracking signal formats that could be used in a tracking channel to track a UE operating in a connected inactive operating mode in NR.

Figure 4:
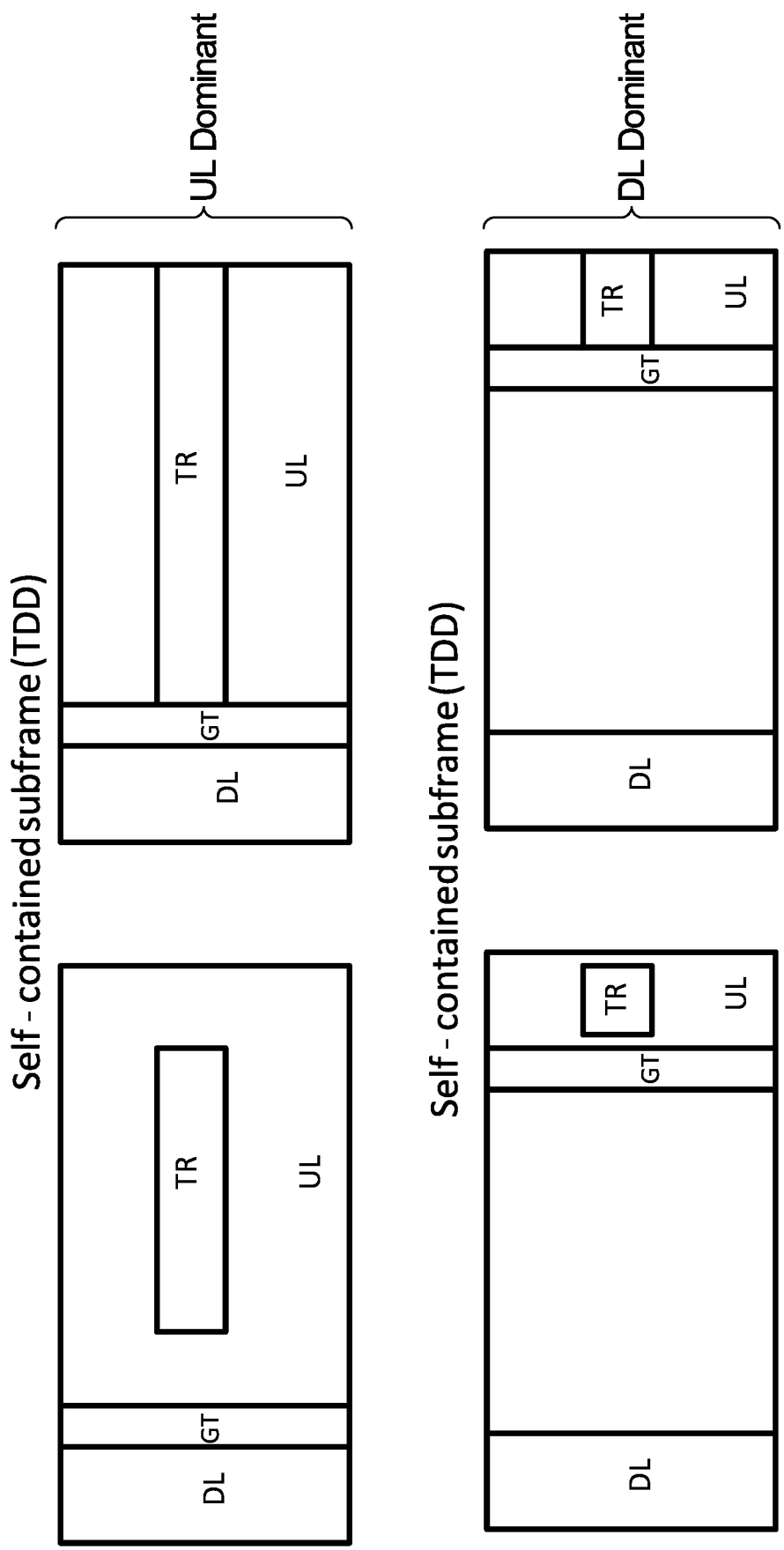
FIG. 4 is a block diagram illustrating examples of TDD subframes that include tracking signal resources located within the UL portion of the TDD subframes according to an embodiment of the present disclosure.

FIG. 4 shows examples of how a tracking signal resource (TR) can be located within the uplink (UL) portion of a TDD subframe. In each TDD subframe, the UL portion is separated from the downlink (DL) portion by a guard time (GT) in the time domain. The two upper examples shown in FIG. 4 are UL dominant TDD subframes and the two lower examples are DL dominant TDD subframes.

Figure 5:
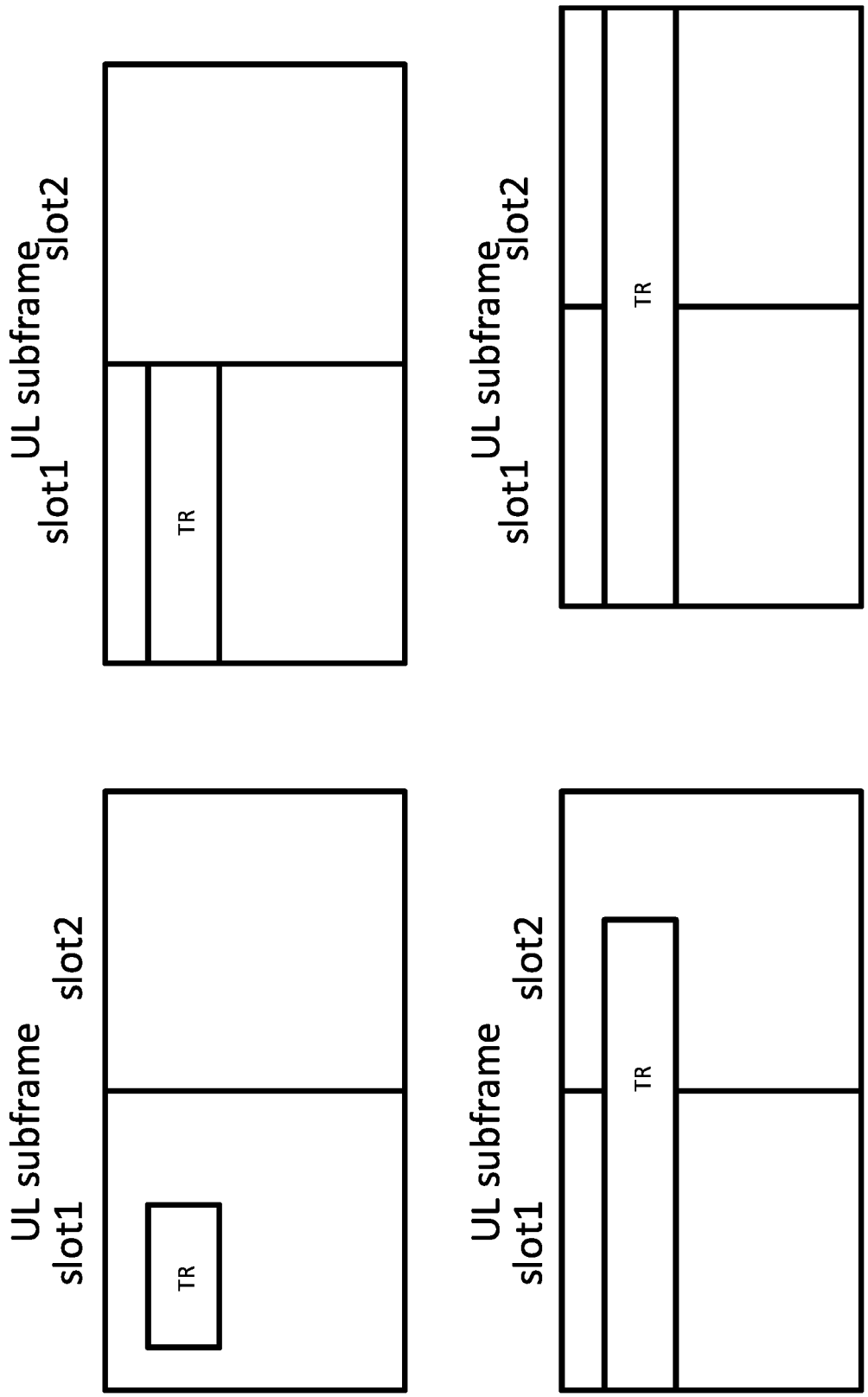
FIG. 5 is a block diagram illustrating examples of FDD subframes that include tracking signal resources according to an embodiment of the present disclosure.

FIG. 5 shows examples of how a tracking signal resource (TR) can be located within a FDD UL subframe that includes two slots (slot 1 and slot 2). In the two upper examples shown in FIG. 5, the TR is located entirely within the first time slot (slot 1). In the lower two examples, the TR bridges the two time slots. There is only a single TR shown in each of the examples of FIG. 5. In other embodiments a transmit signal may be spread across multiple TRs within the same UL subframe.

Figure 6:
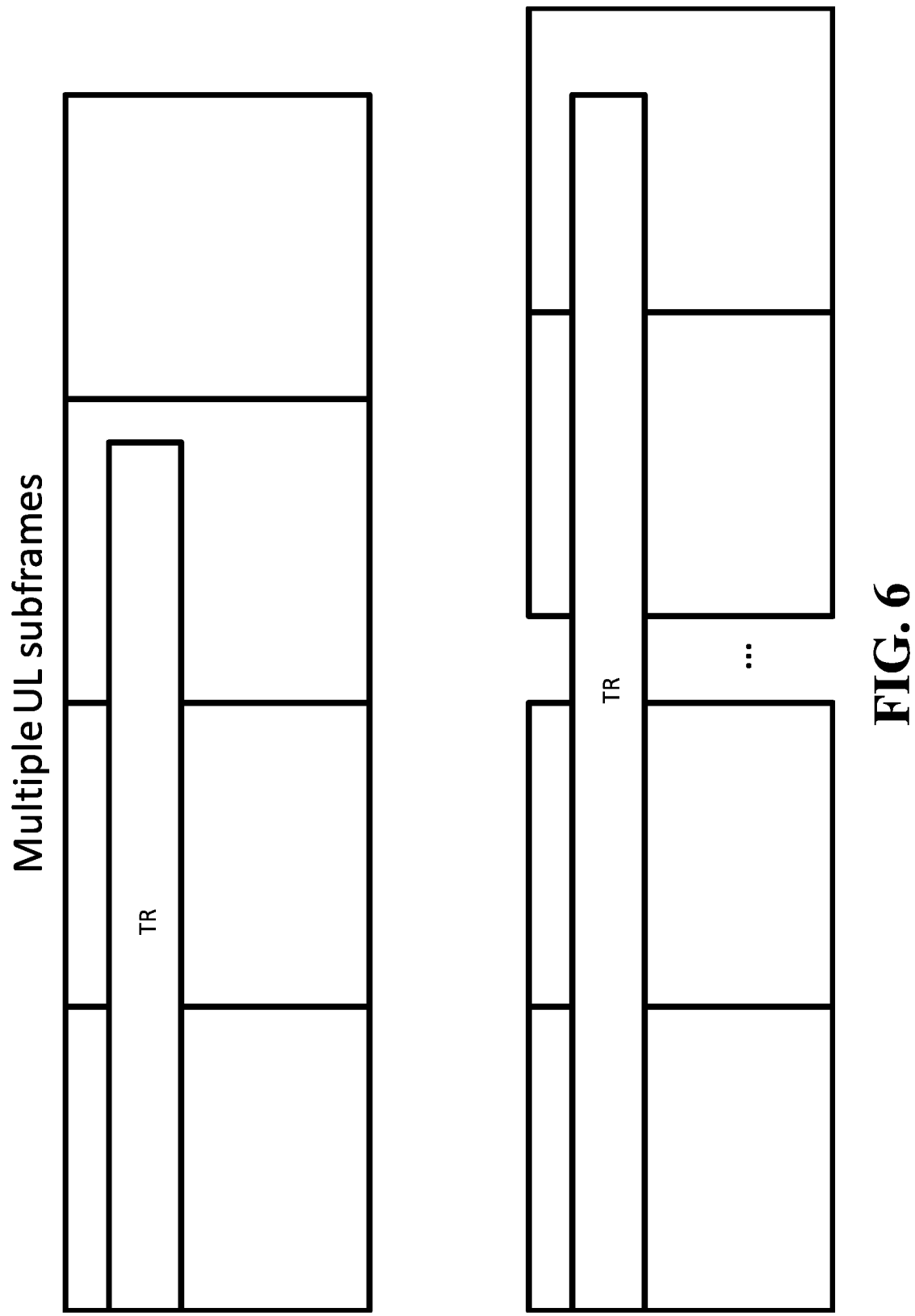
FIG. 6 is a block diagram illustrating examples of FDD subframes with tracking signal resources that bridge multiple FDD subframes according to an embodiment of the present disclosure.

In other embodiments, a TR may bridge multiple FDD UL subframes. FIG. 6 depicts two examples of such embodiments.

Some embodiments provide high frequency beam sweeping/tracking for tracking signal transmission. In order to perform tracking of UEs operating at high frequencies, the beam direction to send/receive must be known, because higher-frequency transmissions require beamforming. Beam sweeping is performed by transmitting the same tracking signal sequence in each beam direction and selecting an appropriate beam direction for transmitting/receiving the tracking signal.

One option to support beam sweeping/tracking is to repeat the same tracking signal multiple times in the same subframe for different beam directions (e.g. B1, B2, ... Bm) for the purpose of beam sweeping and/or tracking. FIG. 7 shows examples of how multiple TRs can be located as self-contained subframes within the UL portion of a TDD subframe to support the repeated transmission of a tracking signal for different beam directions in accordance with this option.

Another option to support beam sweeping/tracking is to repeat the same tracking signal in different subframes, e.g. in subframe i for one direction and again in subframe i+N for another direction, where N can be configured. FIG. 8 shows an example of how a TR can be located as a self-contained subframe within the UL portion of TDD subframes i and i+N to support the repeated transmission of a tracking signal for different beam directions (B1 and B2) in accordance with this option.

Figure 9:
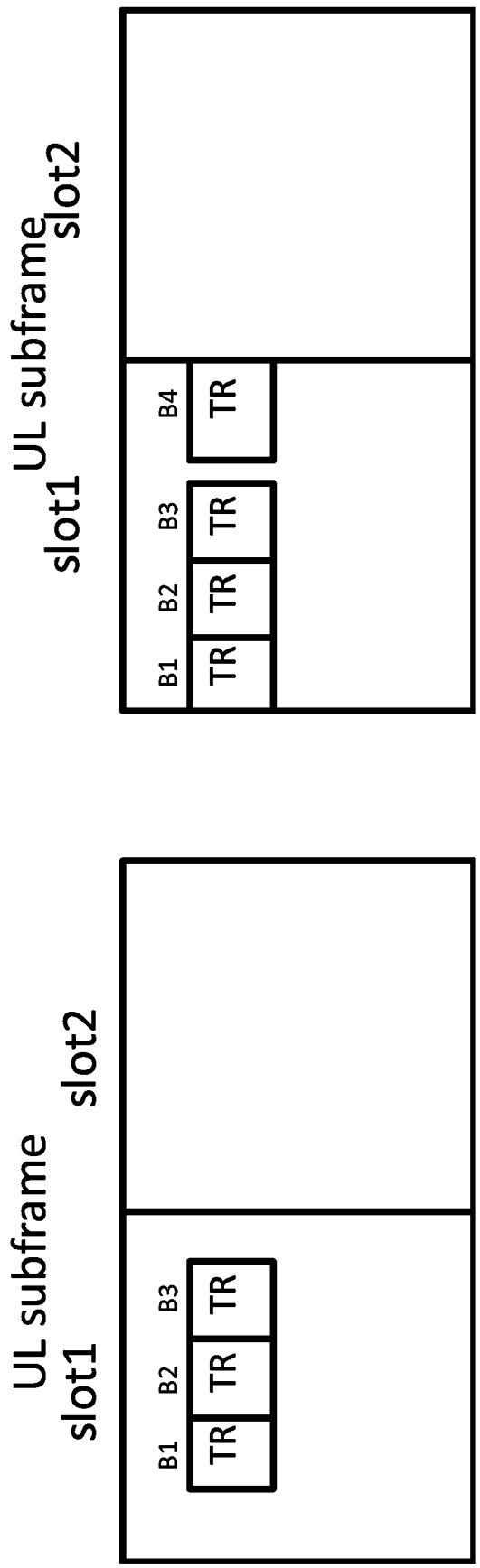
FIG. 9 is a block diagram illustrating examples of FDD subframes that include multiple tracking signal resources to support the repeated transmission of a tracking signal for different beam directions according to an embodiment of the present disclosure.

Beam sweeping/tracking can also be supported in FDD for single and multiple subframes. FIG. 9 shows examples of how multiple TRs can be located within a FDD UL subframe that includes two slots (slot 1 and slot 2) to support the repeated transmission of a tracking signal for different beam directions. It is noted that the multiple TRs need not be contiguous within an UL subframe. For example, the TR for transmission of the tracking signal for beam direction B3 is not contiguous with the TR for transmission of the tracking signal for beam direction B4 in the right hand example shown in FIG. 9.

Beam Based Tracking Signal

In some embodiments, beam sweeping may be performed to determine the optimum antenna beams to use at a transmitter and a receiver for communication.

In cases where channel reciprocity holds, beam sweeping does not need to be performed separately for UL and DL transmissions. The beam selected for DL may be used for UL, or vice versa.

The term reciprocity as it is used herein may refer to either a weak definition of reciprocity or a strong definition of reciprocity. A weak definition of reciprocity includes beam correspondence. With the weak definition of the reciprocity, for each beam pair link in DL, there exists a corresponding beam pair link in UL. Moreover, the reciprocity may be only in one of the sides. For example, the beam correspondence may exist only at the TRP/network side. It means that for a BPL in uplink, there exist a corresponding BPL in DL where there is a correspondence between the UL Rx beam and DL Tx beam. A UE side reciprocity means that there is correspondence between UL Tx beams and DL RX beams. However, it does not mean that the short term channel in UL and DL are the same due to different carrier frequencies in UL and DL (for FDD) or lack of calibration for UL and DL, or different antenna elements used in UL and DL. A strong definition of reciprocity means that the actual short term channel in uplink and downlink are substantially the same.

Figure 10:
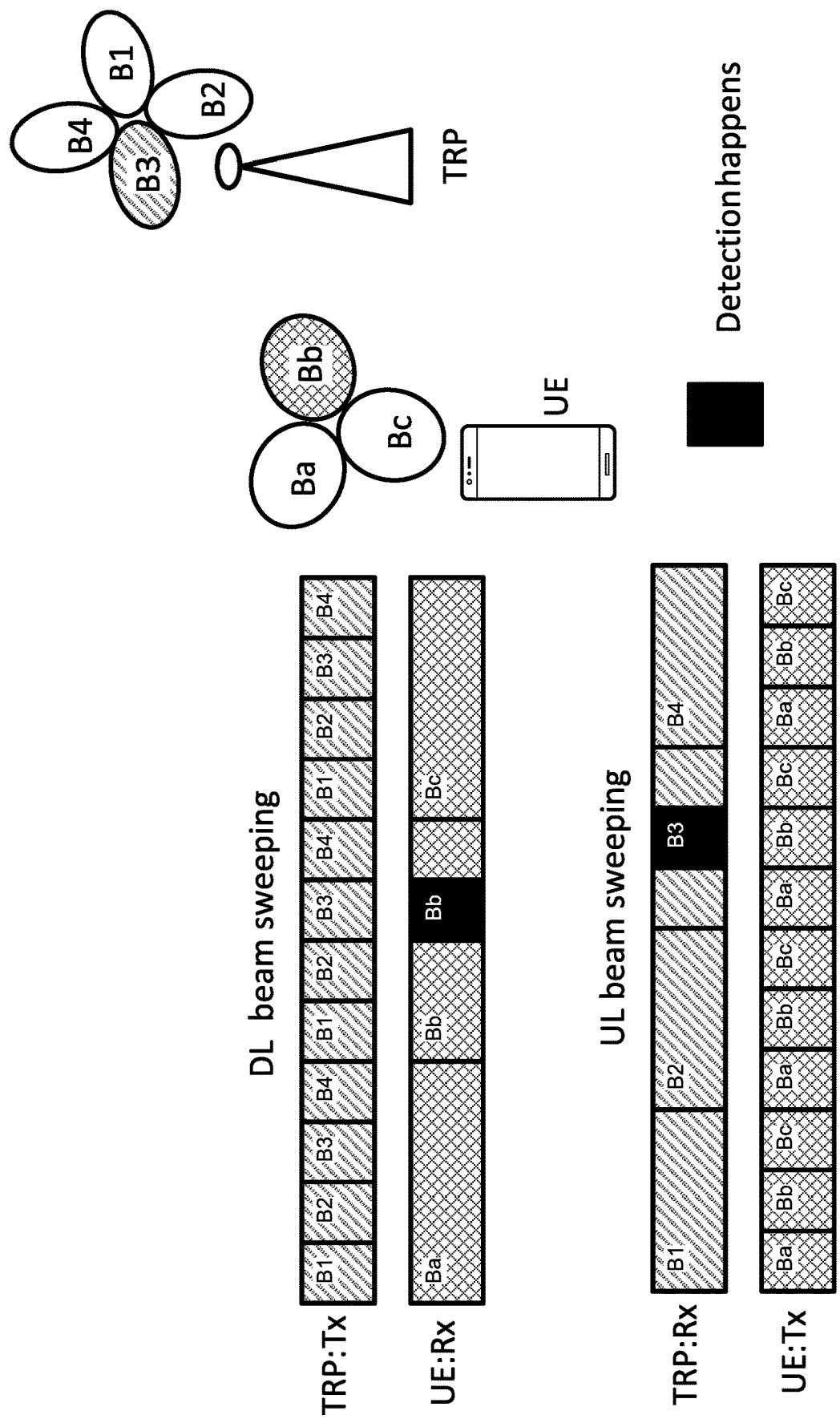
FIG. 10 shows an example of UL beam sweeping and DL beam sweeping performed by a UE and a transmit-receive point (TRP) according to an embodiment of the present disclosure.

If there is no reciprocity, or the reciprocity is not known, then both DL and UL beam sweepings are performed. FIG. 10 shows an example of Tx and Rx beam sweepings performed by a UE and a TRP. In this example, the TRP has four antenna beams B1, B2, B3, B4 and the UE has three antenna beams Ba, Bb, Bc. During DL beam sweeping, the TRP transmits a reference signal sequentially on each of the TRP's four antenna beams and the UE takes turns listening on each of its three antenna beams. In FIG. 10, the UE detects on antenna beam Bb the reference signal transmitted by the TRP on antenna beam B3. In general, DL based beam sweeping is used for cell selection and/or synchronization. For example, in some cases, the UE may perform timing synchronization based on the reference signal that is detected via DL beam sweeping. Due to the lack of known reciprocity, the same DL beam pair is not automatically assumed to be suitable for UL, and therefore UL beam sweeping is also performed.

During UL beam sweeping, the UE transmits a reference signal, e.g. a tracking signal in accordance with embodiments described herein, sequentially on each of the UE's three antenna beams and the TRP takes turns listening on each of its four antenna beams. In FIG. 10, the TRP detects on antenna beam B3 the reference signal transmitted by the UE on antenna beam Bb.

If there is TRP reciprocity (i.e., the same beam direction of the TRP is optimum for DL Tx and UL Rx at the TRP), but without UE reciprocity, the UE behavior with respect to its UL tracking signal may vary depending on whether the UE is aware of the TRP reciprocity.

If the UE is aware of the TRP reciprocity, for example through signaling, and the UE is aware of a mapping between an UL tracking TF resource, and possibly a sequence, to a DL beam for a synchronization signal (SS) or channel state information reference signal (CSI-RS) from which the UE has been able to determine the Tx side of the best DL beam, the UE may send the UL tracking signal on TF resources corresponding to the Tx side of the best DL beam. For example, if a UE is aware that there is TRP reciprocity, and the DL Tx beam index of the TRP (e.g. B3) can be identified by the TF resources on which the beam was sent, then the UE can identify the UL Rx beam direction of the TRP (e.g. B3) based on the DL Tx beam that was previously determined, e.g., during a previous synchronization (due to the TRP reciprocity). In this scenario, only UL Tx beam sweeping at the UE is required. FIG. 11 shows an example of UL Tx beam sweeping at a UE in such a scenario. In the example shown in FIG. 11, the UE has determined that B3 is the UL Rx beam direction of the TRP based on B3 being previously identified as the optimum DL Tx beam direction of the TRP, e.g., during an earlier DL synchronization process with DL beam sweeping. As such, during the UL beam sweeping the UE sequentially transmits its tracking signal on each of its three antenna beams Ba, Bb, Bc only during those times when the TRP is listening on its antenna beam B3. In some embodiments, the UE may choose to send its UL tracking signal in more than one direction if it discovers more than one good DL beam. On the network side, the TRP keeps tracking on all the beam directions of the UL Rx side. The best received direction in the UL and its timing determines the UL Beam pair link (BPL). In addition, this also allows the TRP to determine the best DL Tx beam (e.g., the TRP's DL Tx beam B3) due to choice of TF resources the UE used to transmit its UL tracking signal.

If the UE is not aware of the TRP reciprocity, the UE may send its UL tracking signal on all TF resources (not only on the TF resource(s) that map to the best DL Tx beam). In this scenario, the TRP keeps tracking on all the beam directions of the UL Rx side. The best received direction in the UL and its timing determines the UL BPL. The UL Tx beam of the UL BPL may also be a good DL Tx beam, but not necessarily the best, due to reciprocity only at the TRP side.

In some embodiments, a UE may inform the network of its reciprocity capability using implicit signaling and/or some explicit UE capability exchange with the network.

If there is UE reciprocity (i.e., the same beam direction of the UE is optimum for UL Tx and DL Rx at the UE), but no TRP reciprocity, and the UL Tx beam index of the UE (e.g. Bb) can be identified by the TF resources on which the beam was sent, and the UE UL Tx beam is the same as the UE DL Rx beam (due to UE reciprocity), the UE may use only its best DL Rx beam direction(s) (e.g., determined based on previous detection of a SS or CSI-RS from the TRP) as the only direction(s) in UL. In this scenario, only UL Rx beam sweeping at the TRP is required. FIG. 12 shows an example of UL Rx beam sweeping at a TRP in such a scenario.

In the example shown in FIG. 12, the UE has determined that Bb is the UL Tx beam direction of the UE based on Bb being previously identified as the optimum DL Rx beam direction of the UE, e.g., during an earlier DL synchronization process with DL beam sweeping. As such, during the UL beam sweeping the UE transmits its tracking signal on its antenna beam Bb, and the TRP listens on each of its antenna beams B1, B2, B3 and B4.

FIG. 12 shows two alternatives (alt 1 and alt 2) for UL Rx beam sweeping. In alt 1, the UE transmits its UL tracking signal using only the best DL Rx beam (e.g. Bb) as the UL Tx beam, and transmits the UL tracking signal only on the TF resources corresponding to the Rx side of the best DL beam. In alt 1, transmitting the UL tracking signal only on the TF resources corresponding to the best DL Rx beam is intended to inform the TRP of the Tx side of the best UL beam, because UE UL Tx beam is the same as UE DL Rx beam (due to UE reciprocity). In alt 2, the UE transmits its UL tracking signal using only the best DL Rx beam (e.g. Bb) as the UL Tx beam, but does not use only the TF resources corresponding to the Rx side of the best DL beam. In some embodiments, the UE may choose to send its UL tracking signal in more than one direction if it discovers more than one good DL beam. On the network side, the TRP keeps tracking on all the beam directions of the UL Rx side. The best received direction in the UL and its timing determines the UL BPL. In addition, if the TRP is aware of the UE reciprocity, and the UE transmits its UL tracking signal using alt 1, this allows the TRP to determine the best DL Rx beam (e.g., the TRP's DL Rx beam Bb) due to choice of TF resources the UE used to transmit its UL tracking signal. In other words, if the TRP is aware of the UE reciprocity, and the UE transmits its UL tracking signal using alt 1, the TRP potentially knows both Tx and Rx sides of the best UL beam, as well as the best RX side of the best DL beam. If the TRP is aware of the UE reciprocity, but the UE transmits its UL tracking signal using alt 2, the TRP knows only the Rx side of the best UL beam and the UE knows only the Tx side of the best UL beam.

If the TRP is not aware of the UE reciprocity, the UE may still send its UL tracking signal only on the TF resources corresponding to Rx side of the best DL beam in accordance with alt 1, and the TRP may track on all the beam directions of the UL Rx side and us the best received direction in the UL and its timing to determine UL BPL and also the best DL Rx beam due to choice of TF resources.

Figure 13:
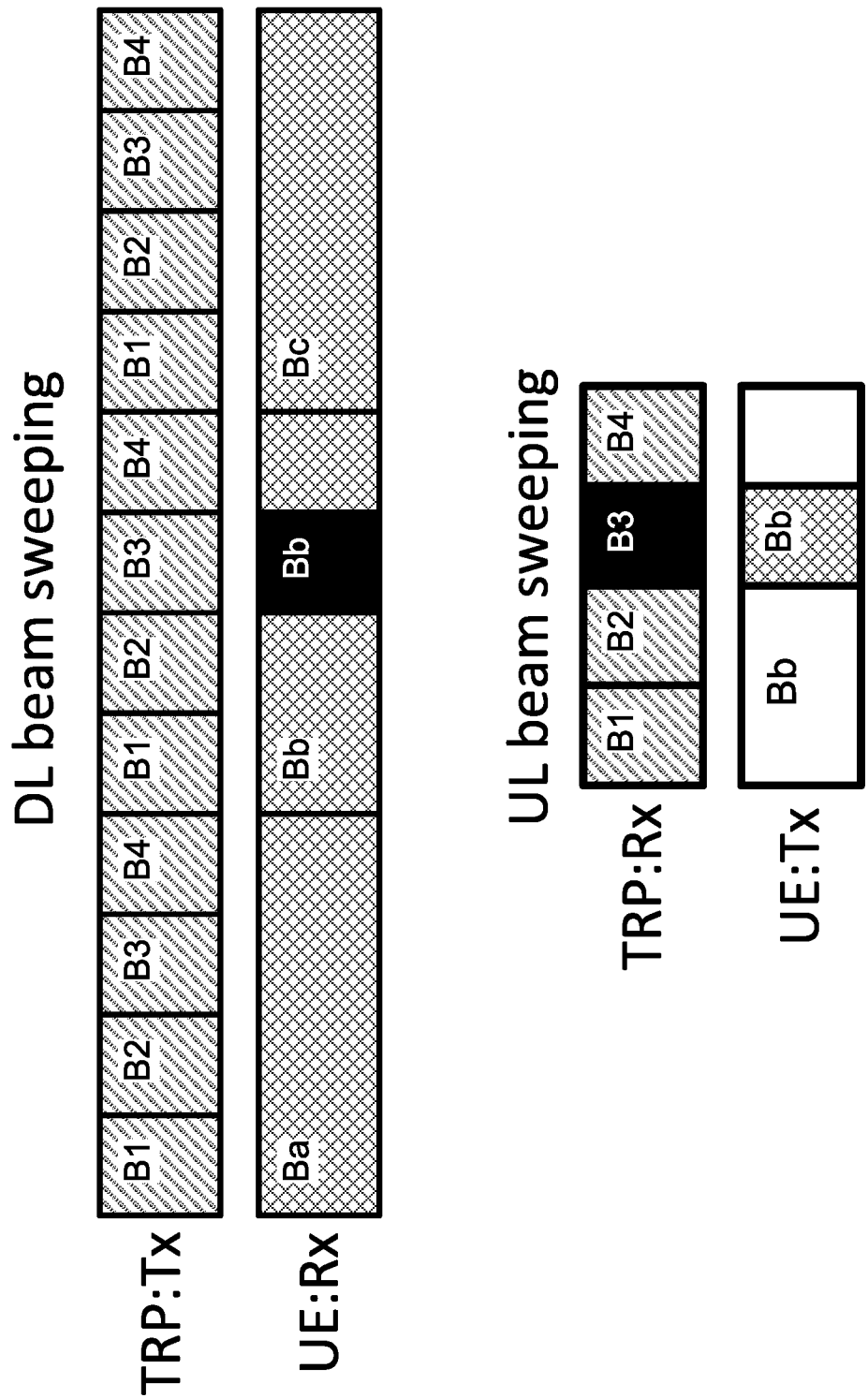
FIG. 13 shows an example of UL beam sweeping and DL beam sweeping performed by a UE and a TRP according to still another embodiment of the present disclosure.

If reciprocity applies to both TRP and UE, the UE only needs to send its tracking signal to the TRP on the known Tx and Rx beam occasion. FIG. 13 shows an example of tracking signal transmission at a UE in such a scenario. In the example shown in FIG. 13, the UE has determined that B3 is the Rx beam direction of the TRP based on B3 being previously identified as the Tx beam direction of the TRP, and has determined that the UE's Tx beam direction is Bb based on Bb being previously identified as the UE's Rx beam direction. As such, the UE only transmits its tracking signal to the TRP on beam Bb during those times when the TRP is listening on its antenna beam B3.

More generally, if there is reciprocity at both a TRP and a UE, the behavior of the UE and/or the TRP with respect to the UE's UL tracking signal may vary depending on whether the UE and/or the TRP is aware of the reciprocity.

If there is both TRP reciprocity and UE reciprocity, and the UE is aware of the reciprocity at the TRP and the TRP is aware of the reciprocity at the UE, the UE may send its UL tracking signal only on the TF resources corresponding to the received DL beam. For example, if the UE is aware of the TRP reciprocity, and the UE is aware of a mapping between an UL tracking TF resource, and possibly a sequence, to a DL beam for a synchronization signal (SS) or channel state information reference signal (CSI-RS) from which the UE has been able to determine the Tx side of the best DL beam, the UE may send the UL tracking signal on TF resources corresponding to the Tx side of the best DL beam. In some embodiments, the UE may choose to send its UL tracking signal in more than one direction if it discovers more than one good DL beam. On the network side, the TRP keeps tracking on all the beam directions of the UL Rx side. The best received direction in the UL and its timing determines the UL BPL. In addition, this also allows the TRP to determine the best DL Tx and Rx sides of the DL BPL due to choice of TF resources the UE used to transmit its UL tracking signal and reciprocity. In some embodiments, the UE may be informed by the network of a mapping between an UL tracking TF resource, and possibly a sequence, to a DL beam for SS or CSI-RS, and the UE may inform the network of its reciprocity capability using implicit signaling and/or some explicit UE capability exchange with the network.

If there is both TRP reciprocity and UE reciprocity, and the TRP is aware of the reciprocity at the UE but the UE is not aware of the reciprocity at the TRP, the UE's behavior may be the same as that described above with reference to FIG. 12 for the scenario in which there is only UE reciprocity. In which case, both alt 1 and alt 2 options may apply with the same impact as described above. As in the other scenarios, the UE may inform the network of its reciprocity capability using implicit signaling and/or UE capability exchange. On the network side, the TRP keeps tracking on all the beam directions of the UL Rx side. The best received direction in the UL and its timing determines the UL BPL. In addition, the UL Tx beam and the UL Rx beam of the UL BPL may also be a good DL Rx beam and a good DL Tx beam due to reciprocity.

If there is both TRP reciprocity and UE reciprocity, and the UE is aware of the reciprocity at the TRP but the TRP is not aware of the reciprocity at the UE, the UE behavior may be the same as that described above with reference to FIG. 13 for the scenario in which both the UE and the TRP aware of the reciprocity on both sides, i.e., the UE may send its UL tracking signal only on the TF resources corresponding to the received DL beam. As described above, the network may have informed the UE of a mapping between an UL tracking TF resource, and possibly a sequence, to a DL beam for a SS or CSI-RS from which the UE is able to determine the Tx side of the best DL beam. On the network side, the TRP behavior may be the same as that described above with reference to FIG. 11 for the scenario in which there is only TRP reciprocity.

If there is both TRP reciprocity and UE reciprocity, but neither the TRP nor the UE are aware of the other's reciprocity, both the TRP and the UE act as if reciprocity only applies at their end. For example, the UE behavior may be the same as that described above with reference to FIG. 12 for the scenario in which only the UE has reciprocity and the network behavior may be the same as that described above with reference to FIG. 11 for the scenario in which there is only TRP reciprocity.

Sequence Design

Any sequences with low cross correlation can be used, e.g. Zadoff-Chu (ZC) sequence, gold sequences, computer search Quadrature Phase Shift Keying (QPSK) sequences with low peak-to-average-power-ratio and cubic metric PAPR/CM.

In some embodiments, a ZC sequence as defined below is used (where m is the sequence symbol index, and $x_q$ is the base ZC sequence for root q):

$$x_q(m) = e^{-j\frac{\pi q m(m+1)}{N_{ZC}}}, 0 \leq m \leq N_{ZC} - 1$$

The above ZC sequence has a number of desirable properties, such as:
Low cross correlation between sequences with different roots
Longer sequence length, Nzc (prime number), higher number of roots, i.e., Nzc-1
Cyclic time shifted sequences based on the same base sequence (with same root) are orthogonal (time shift must be larger than channel delay spread)
Longer sequence duration, larger number of orthogonal sequences
Cyclic shift α of a base sequence is given by $$x_q^{(\alpha)}(m) = e^{j\alpha m} x_q(m)$$

Constant amplitude has a low CM/PAPR

ZC Sequence Parameters Design

When tracking sequences based on ZC sequences are used, ZC sequence parameters, such as sequence duration $T_{SEQ}$ and sequence length Nzc, may be configured based on one or more of the following considerations.

Sequence Duration

In some embodiments, the sequence duration ($T_{SEQ}$) is configured so that it is larger than the sum of the maximum round trip time (RTT), timing mismatch, and delay spread, depending on the maximum distance from a UE to TRPs that expect to receive the UE's tracking signal, i.e.

$T_{SEQ} >$ RTT+timing mismatch+channel delay spread

In some embodiments, the sequence duration is configured to provide a particular coverage performance. For example, for a required sequence energy to noise ratio Ep/No to satisfy a target miss detection and false alarm probability $T_{SEQ}$ can be defined according to:

$T_{SEQ} = No*Nf/P\_RA(r)*Ep/No$, where $P\_RA(r) = P \max + G\_a - L(r) - LF - P\_L$ (dB)

where P max is max Tx power, G_a is antenna gain, L(r) is path loss (distance dependent), P_L is penetration loss, LF is log-normal fade margin, No is thermal noise power density, Nf is receiver noise figure, and P_RA(r) is the average power received at the TRP at distance r.

In some embodiments, the sequence duration is configured to provide compatibility with data/control subcarrier spacing.

In some embodiments, the sequence duration is configured based on the number of UEs that need to utilize orthogonal sequences. For example, as discussed previously, a larger $T_{SEQ}$ can provide a larger number of orthogonal sequences (with different cyclic time shifts) to support UEs which are close to each other. However, the use of a longer sequence duration comes at the expense of more overhead in the time domain.

Sequence Length (in # of Subcarriers)

The elements of a tracking sequence are transmitted on subcarriers within the tracking signal bandwidth. In some embodiments, the number of subcarriers within the tracking signal bandwidth is dependent on the subcarrier spacing. Therefore, the sequence length is limited by the subcarrier spacing and the tracking signal bandwidth (accounting for the bandwidth occupied by guard bands/tones if present).

For example, based on the sequence duration $T_{SEQ}$ that satisfies the above criteria, the subcarrier spacing for the tracking signal can be determined (e.g. compatibility with data/control subcarrier spacing).

Knowing the tracking signal bandwidth, $BW_{TS}$, and the subcarrier spacing, the number of subcarriers for tracking signal sequence and guard tones can be determined. The ZC sequence length, Nzc, is a prime number that is less than the number of tracking signal subcarriers. For example, in some embodiments, if there are 284 tracking signal subcarriers, the ZC sequence length, Nzc, may be 283, which is the largest prime number that is less than 284. Larger length provides more base sequences (different roots), thereby supporting more UEs.

ZC Sequence Grouping

Based on Nzc, the base sequences can be separated in different groups. Each group may contain more than one base sequence, with base sequences in the same group having high cross correlation and base sequences in different groups have low cross correlation. In some embodiments, one or more criteria may be applied to determine which base sequences from the pool of all base sequences are used. For example, in one embodiment base sequences that provide CM/PAPR lower than a data signal may be preferentially used first.

Tracking Signal Design Example

In some embodiments, the number of potential ZC sequences that can be generated depends on sequence length, Nzc, the number of cyclic time shifts that are possible, and T/F resources allocated. For illustrative purposes, consider a tracking signal BW of 720 kHz, with a duration of 6 data symbols. For a sequence length Nzc=283, there are 282 base sequences (different roots). For each base sequence, consider 12 cyclic time shifts per one data symbol (i.e 5.9 μs time shift), hence there are 12*6=72 orthogonal sequences that can be used at the same T/F resource. This means that the possible sequence pool size=282*72=20,304 sequences. Such a tracking signal design may be suitable for supporting the needs of an Ultra Dense Network (UDN) with inter-site distance (ISD)=200 m, for example.

Example of Tracking Signal Formats

Different tracking signal formats can be defined to support different scenarios and conditions. For example, different tracking signal formats can be defined to support:
Different deployment scenarios
Different UEs' capabilities
Different target tracking performance
Different frame structures, e.g. to fit in UL portion of self-contained subframe
FDD/TDD Table 1 below provides examples of four different tracking signal formats.

TABLE 1

|  | Format 0 | Format 1 | Format 2 | Format 3 |
| --- | --- | --- | --- | --- |
| $T_{TS}$ (micro sec.) | 71.87 | 142.74 | 285.48 | 214.11 |
| $T_{SEQ}$ (micro sec.) | 66.67 | 133.34 | 266.68 | 133.34 |
| $T_{CP}$ (micro sec.) | 2.95 | 5.2 | 7.4 | 31.7 |
| $T_{GT}$ (micro sec.) | 2.25 | 4.2 | 11.4 | 48.37 |
| # $T_{SEQ}$ SCs | 67 | 134 | 277 | 199 |
| Subcarrier Spacing (kHz) | 15 | 7.5 | 3.75 | 5 |
| Coverage Range (km) | 0.337 | 0.630 | 1.11 | 4.83 |

T/F Resource Planning

Various time-frequency resource planning strategies may be employed in embodiments of the present disclosure. Some non-limiting examples include
Pseudo random planning, e.g. based on gold sequence
Fixed planning, e.g. with equal spaced time/frequency separation
to coincide with discontinuous reception (DRx) occasions, can be the same or lower periodicity of DRx
Frequency hopping (to exploit the potential much larger UE/system BW in NR)
High speed UEs may have dedicated T/F resources with sequences (different root, BW, duration) suitable for high speed UEs, different numerology, e.g. larger subcarrier spacing Sequence to UE Assignment for the Purpose of Interference Randomization In some embodiments, interference randomization (interference between UEs may be randomized) is achieved by assigning sequences to UEs based on:
a hyper cell-ID;
a UE-ID;
a group-specific or UE-specific seed signaled by RRC signaling, e.g. Medium Access Control, Control Element (MAC CE) enabled (between dynamic Downlink Control Information (DCI) and high level RRC signalings); or
a combination of the above parameters (e.g., may be based on UE-ID, seed, and hyper cell-ID).

In other embodiments, the assignment may be pseudo random or fixed.

In current LTE systems, the Cell-ID of a cell serving a UE is used as a seed to randomize the "sequence-group hopping pattern" and shift offset that are assigned to a UE to use to generate a sounding reference signal (SRS) when operating in the active/connected state. The objective of this type of assignment is to allow a group of UEs with the same cell ID to use the same T/F resource and base sequence, with different cyclic time shifts (for orthogonality). Different base sequences and their cyclic shift versions may also be used (without orthogonality, but with low cross correlation) in some situations. The drawback of this type of assignment (i.e. Cell-ID based) is that nearby cell-edge UEs served by different cells will use different base sequences, hence can interfere with each other (though the cross correlation may not be high).

As discussed previously, it is possible in NR that there is no rigid cell boundary. In such a scenario, the network may identify a group of UEs which are in the same zone (e.g., near a cell-edge), and can assign the UEs that are in the group the same "seed" in place of "Cell-ID" to determine the same hopping patterns, and use the same base sequence, but use different cyclic shifts so that their tracking sequences can be orthogonal. In contrast to LTE, this doesn't define a rigid cell boundary, but roughly a zone, where UEs in the same zone can use cyclic time shifted orthogonal sequences. UEs in different zones can be assigned different seeds, because UEs located in spatially separated zones are unlikely to interfere with one another, so any cross-correlation between the sequences in different zones is unlikely to be problematic. It is understood that a zone may be a region of a coverage area, e.g., within a cell or within a hyper-cell or across multiple cells.

Sequence/TF Resource to UE Assignment

In some embodiments, mapping of a tracking signal sequence and TF resource to a UE is UE-specific. For example, in some embodiments, a UE is provided with inputs, such as, UE-ID, a seed (for pseudo random generator) which can be a group-specific or UE-specific seed signaled by RRC signaling, e.g. MAC CE enabled (between dynamic DCI and high level RRC signaling), NR cell ID (e.g. hypercell ID), a security key (for security), and a time instant (for time varying output parameters). Based on these inputs, the UE derives the tracking signal parameters and TF resource that have been assigned to it by the network. These include, for example:
  Tracking signal format, including CP/GT/BW
  ZC sequence related parameters, which can be time varying, e.g.
    Sequence length
    Root (i.e. determining base sequence)
    Cyclic shift
  T/F resources, which can be time varying
  Open Loop (OL) power control parameters
Based on the tracking signal parameters, the UE may determine the UE-specific tracking sequence. In some embodiments, at least one of a group of inputs including the UE-ID, the seed, NR cell ID, security key and the time instant may be used to determine the tracking signal parameters and TF resource. Moreover, in some embodiments, at least one of a group of inputs including the UE-ID, the seed, NR cell ID, the security key may be received by the UE from a network element through a signalling.

Tracking Response

In some embodiments, a network element, after having received a tracking signal from a UE, transmits a tracking response to the UE to confirm that it has detected the UE. In other embodiments, no tracking response is transmitted in response to receiving a tracking signal. A tracking response may be a short response (e.g. 1 bit to acknowledge that the network element can measure the tracking signal sequence), or a longer response. A longer tracking response message may contain an acknowledgement that the UE is detected, timing advance (TA) tuning information and/or power control information.

Power Control

Tracking signal procedures could include other features, such as power control, for example.

In an embodiment, open-loop power control is adopted. The UE estimates the received power associated with one or more DL channels/sequences, such as a synchronization signal (SS), physical broadcast channel (PBCH) or some other reference signal, and then determines the UL tracking power by combining the estimated received power with certain network-centric or UE-centric parameters.

In another embodiment, closed-loop power control is adopted. The network, periodically or on an on demand basis, updates the power control parameter (e.g., as part of a tracking response message as described above). UEs may use the parameters in OL power control combined with the message in a tracking response to adjust transmit power.

In another embodiment, a power ramp up/down strategy is adopted. With short tracking response, the UE ramps up power from the last tracking time if a tracking response was not received for the last tracking signal that it transmitted. The UE may continue to ramp up its power at successive tracking times until it receives a tracking response or until it reaches a maximum transmit power. Conversely, if the UE receives a tracking response, it may ramp down its transmit power until it does not receive a tracking response or until it reaches a minimum transmit power.

Figure 14:
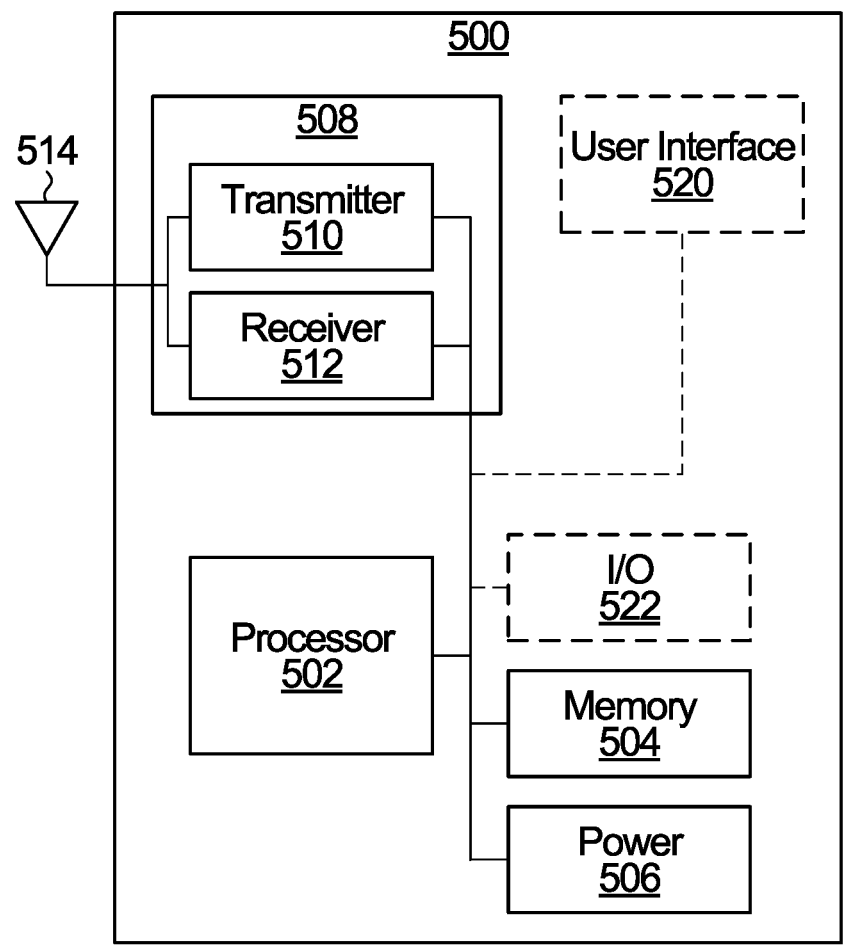
FIG. 14 is a block diagram of a UE according to an embodiment of the present disclosure.

FIG. 14 shows one embodiment of a UE 500 for implementing the methods and modules described herein. The UE 500 may include a processor 502, a memory 504, a power source 506 and a wireless communications interface 508 for sending and receiving data in the communications network 100 shown in FIG. 1, which components may or may not be arranged as shown in FIG. 2. The wireless communications interface 508 includes a transmitter 510 and a receiver 512 coupled to an antenna 514. It will be appreciated that the functions of the wireless communications interface 508 may be carried out by different transceiver or modem components including multiple transmitter, receiver, digital signal processor (DSP) and antenna components or arrays. In one embodiment, the UE 500 includes a user interface 520 and various inputs/outputs (I/O) 522 such as a display, audio input, audio output, keypads, buttons, microphones or other inputs or outputs. The memory 504 may store programming and/or instructions for the processor 502 including instructions for sending, receiving, processing and supporting different services and types of data, such as but not limited to video, VoIP calls, web browsing data, email and other text communications.

Figure 15:
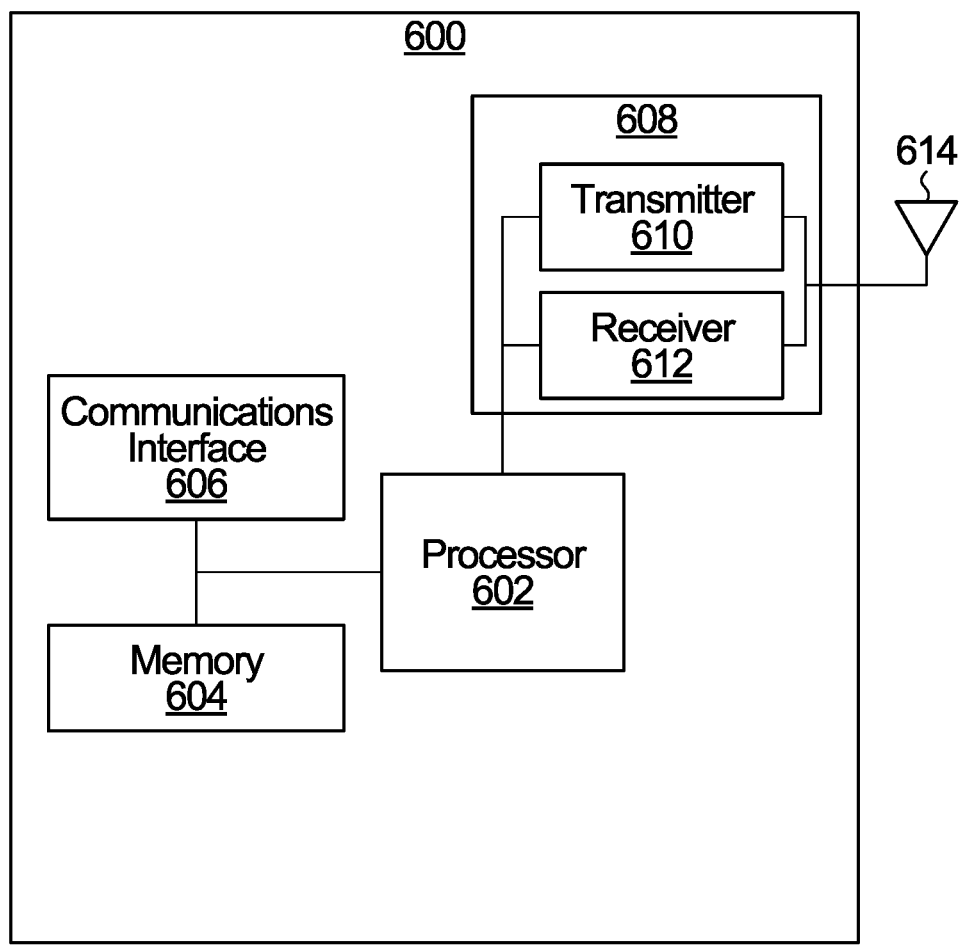
FIG. 15 is a block diagram of a TRP according to an embodiment of the present disclosure.

FIG. 15 illustrates a TRP 600 according to an embodiment of the present application. The TRP 600 may comprise a processor 602, a memory 604, one or more communications interfaces 606, 608. The communications interface 606 may be a wired or wireless interface for sending and receiving data to a backhaul network or to other network nodes, gateways or relays in a network, such as the network 100 shown in FIG. 1. The wireless communications interface 608 is configured to send and receive data with one or more UEs, including assigning SRS channels and performing uplink channel measurements based on received SRSs as described herein. The wireless communications interface 608 includes a transmitter 610 and a receiver 612 coupled to an antenna 614. It will be appreciated that the functions of the wireless communications interface 608 may be carried out by different transceiver or modem components including multiple transmitter, receiver and antenna components or arrays. The memory 604 may store programming and/or instructions for the processor 602, including instructions for sending and receiving data to and from a UE.

Figure 16:
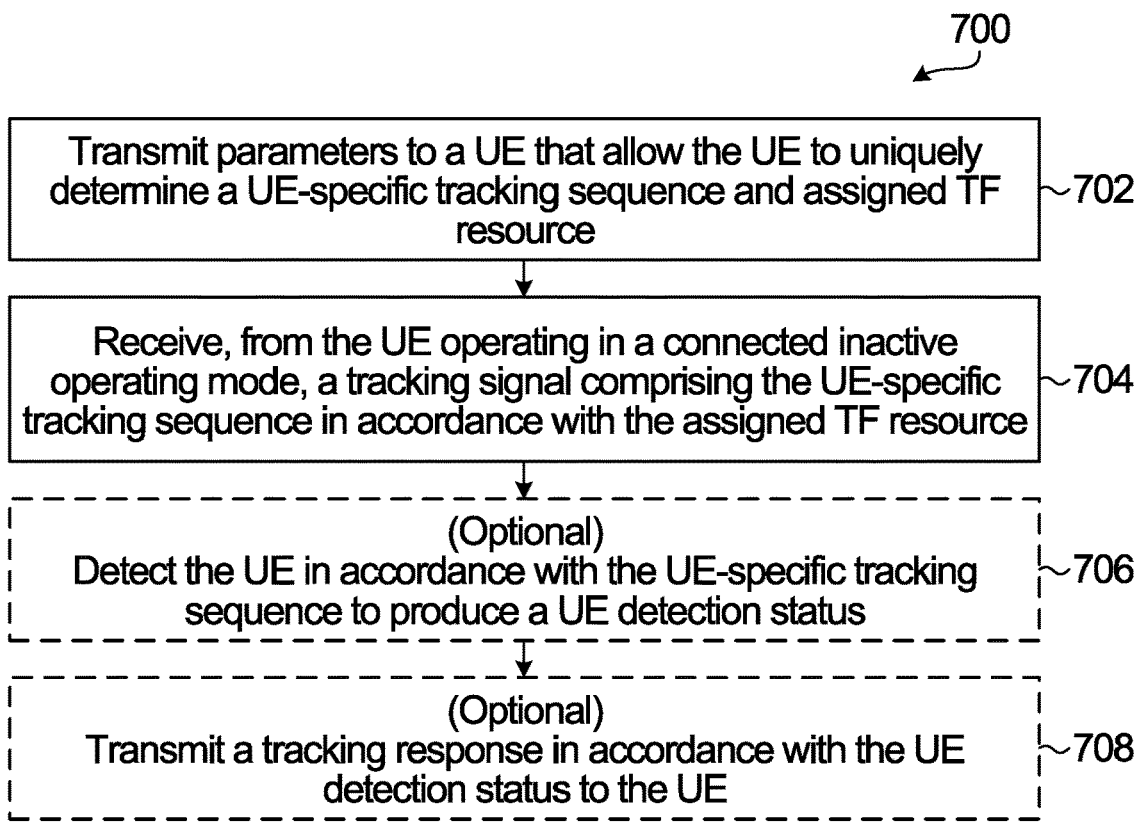
FIG. 16 is a flow diagram of example operations in a TRP in accordance with an embodiment of the present disclosure.

FIG. 16 illustrates a flow diagram of example operations 700 in a TRP according to example embodiments described herein.

In block 702, the TRP transmits parameters to a UE that allow the UE to uniquely determine a UE-specific tracking sequence and assigned TF resource. The UE-specific tracking sequence and assigned TF resource are independent of a transmit-receive point identifier (TRP ID) associated with the TRP In block 704, the TRP receives, from the UE operating in a connected inactive operating mode, a tracking signal comprising the UE-specific tracking sequence in accordance with the assigned TF resource.

Optionally, in block 706, the TRP detects the UE in accordance with the UE-specific tracking sequence to produce a UE detection status. In some implementations, the UE detection status may be the information indicating whether or not the TRP was able to measure the UE-specific tracking sequence, or the UE detection status may include further information based on the detection of the UE-specific tracking sequence, such as one or more of timing information, power information, beam pair link information, and beam quality.

Optionally, in block 708, the TRP transmits a tracking response in accordance with the UE detection status to the UE. For example, the tracking response may be a short response (e.g. 1 bit to acknowledge that the network element can measure the tracking signal sequence), or a longer response. The longer tracking response message may contain one or more of an acknowledgement that the UE is detected, timing advance (TA) tuning information and power control information.

From the foregoing, it is clear that in some embodiments, UE Uplink tracking may be used so TRPs in the same cell or neighboring cells can measure and evaluate the link quality between themselves and a UE. This link quality can be used for UL based Radio Resource Management (RRM) measurement as a complimentary tool to DL based RRM measurement or as a standalone feature or for optimizing the best TRP or set of TRPs for serving the UE to maintain its capabilities even when the UE is in an inactive mode. The total UE "on" time for sending the sequence and establishing an updated link or set of links is small and allows for saving the battery life of the UE. In accordance with the methods provided herein, the uplink timing for a UE can be maintained and updated whenever the tracking response is available. Moreover, according to aspects of the present disclosure, a UE can potentially optimize the on time and energy usage (battery drain) by adjusting the rate of tracking sequence transmission.

The example operations 700 are illustrative of an example embodiment. Various ways to perform the illustrated operations, as well as examples of other operations that may be performed, are described herein. Further variations may be or become apparent.

Figure 17:
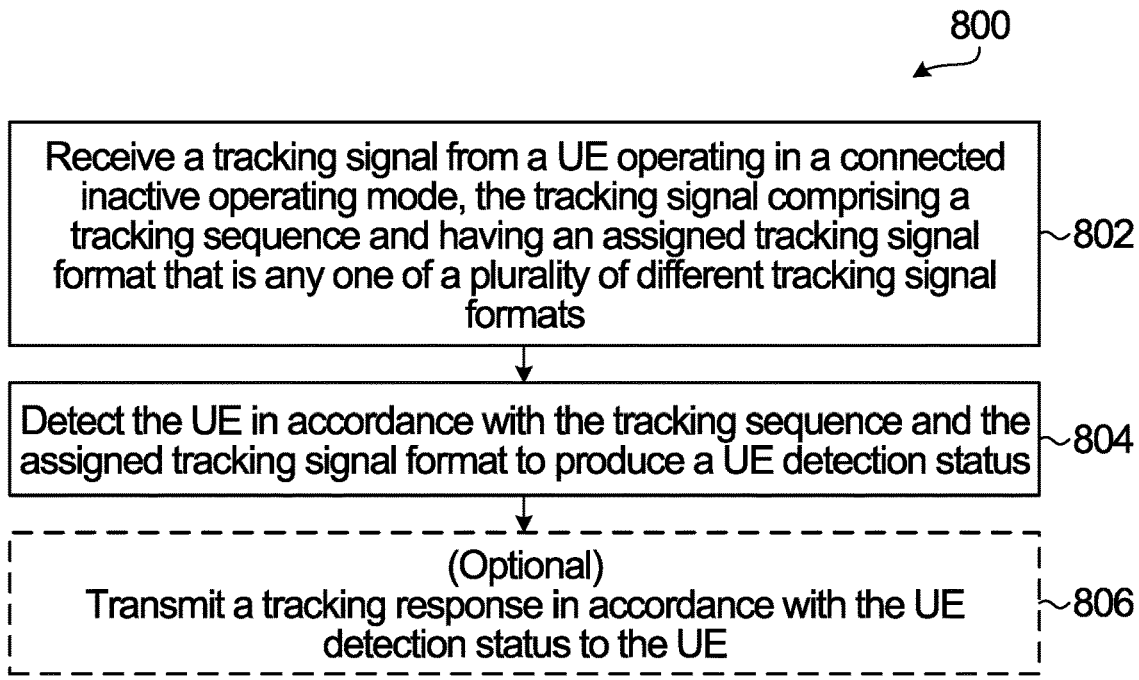
FIG. 17 is a flow diagram of example operations in a TRP in accordance with an embodiment of the present disclosure.

FIG. 17 illustrates a flow diagram of example operations 800 in a TRP according to example embodiments described herein.

In block 802, the TRP receives a tracking signal from a UE operating in a connected inactive operating mode, the tracking signal comprising a tracking sequence and having an assigned tracking signal format that is any one of a plurality of different tracking signal formats.

In block 804, the TRP detects the UE in accordance with the tracking sequence and the assigned tracking signal format to produce a UE detection status.

Optionally, in block 806, the TRP transmits a tracking response in accordance with the UE detection status to the UE. As noted earlier, in some embodiments no tracking response is transmitted.

The example operations 800 are illustrative of an example embodiment. Various ways to perform the illustrated operations, as well as examples of other operations that may be performed, are described herein. Further variations may be or become apparent.

Figure 18:
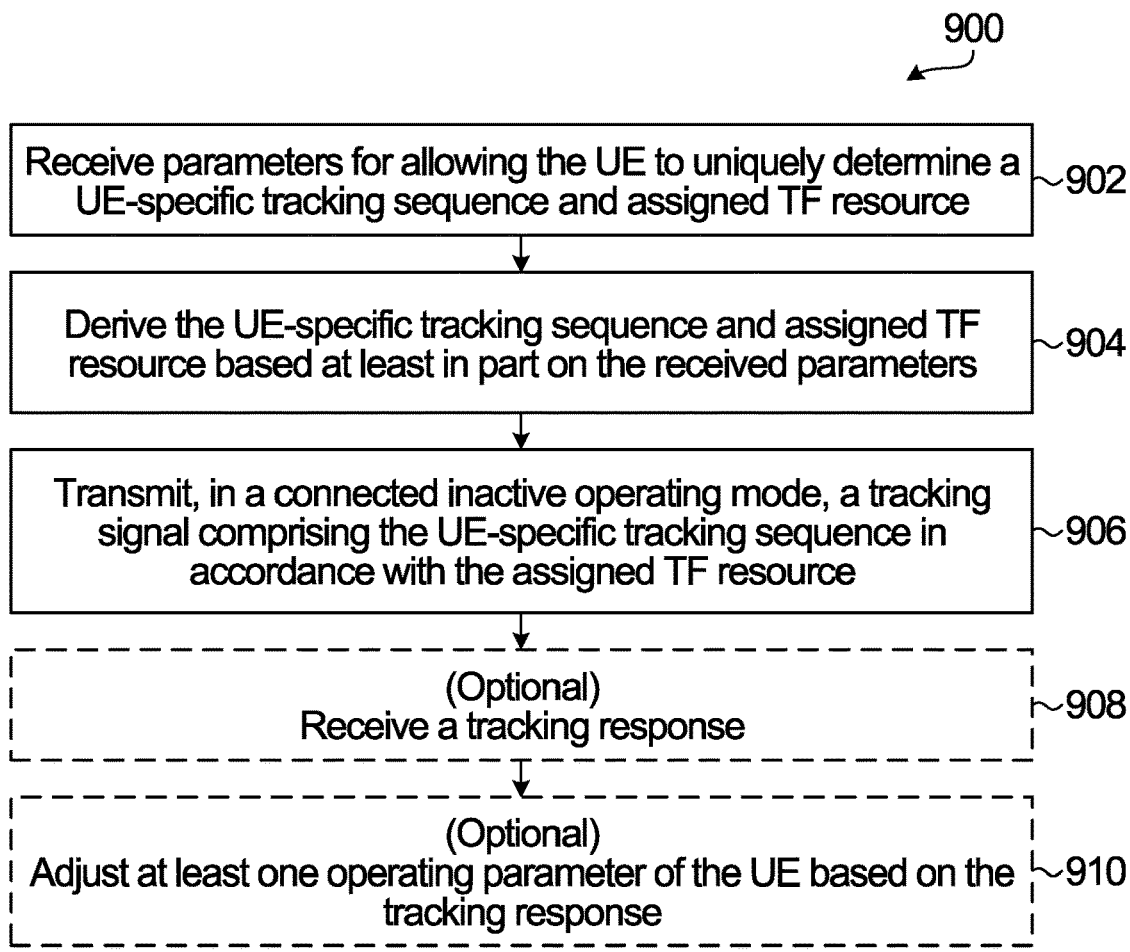
FIG. 18 is a flow diagram of example operations in a UE in accordance with an embodiment of the present disclosure.

FIG. 18 illustrates a flow diagram of example operations 900 in a UE according to example embodiments described herein.

In block 902, the UE receives, from a TRP in a communication network, parameters for allowing the UE to uniquely determine a UE-specific tracking sequence and assigned TF resource. The UE-specific tracking sequence and assigned TF resource are independent of a transmit-receive point identifier (TRP ID) associated with the TRP.

In block 904, the UE determines the UE-specific tracking sequence and assigned TF resource based at least in part on the parameters received from the TRP.

In block 906, the UE transmits, in a connected inactive operating mode, a tracking signal comprising the UE-specific tracking sequence in accordance with the assigned TF resource. In the connected inactive operating mode, the UE context and ID are preserved by the network, and signaling, power consumption, and resource utilization are reduced. The transmission of the tracking signal in this operating mode allows the network to continue keeping track of the locations of the UEs, allowing efficient paging, maintaining uplink timing alignment and determining UE-TRP association.

Optionally, in block 908, the UE receives a tracking response from the TRP.

As discussed previously, in some embodiments a tracking response may include parameter adjustment commands/ information, such a timing advance tuning commands and/or power control commands. Accordingly, in some embodiments, optionally in block 910, the UE adjusts at least one operating parameter of the UE based on the tracking response. For example, the UE may adjust its transmit power based on a power control command received as part of the tracking response.

The example operations 900 are illustrative of an example embodiment. Various ways to perform the illustrated operations, as well as examples of other operations that may be performed, are described herein. Further variations may be or become apparent.

Figure 19:
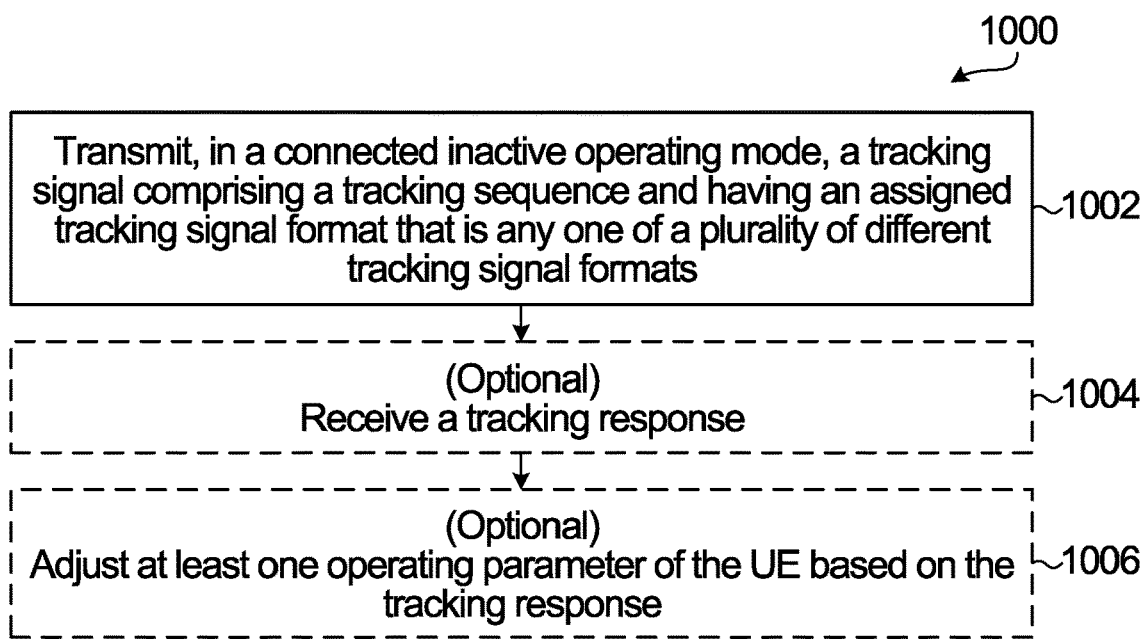
FIG. 19 is a flow diagram of example operations in a UE in accordance with an embodiment of the present disclosure.

FIG. 19 illustrates a flow diagram of example operations 1000 in a UE according to example embodiments described herein.

In block 1002, the UE transmits, in a connected inactive operating mode, a tracking signal comprising a tracking sequence and having an assigned tracking signal format that is any one of a plurality of different tracking signal formats.

Optionally, in block 1004, the UE receives a tracking response from the TRP.

As discussed previously, in some embodiments a tracking response may include parameter adjustment commands/ information. Accordingly, in some embodiments, optionally in block 1006, the UE adjusts at least one operating parameter of the UE based on the tracking response.

The example operations 1000 are illustrative of an example embodiment. Various ways to perform the illustrated operations, as well as examples of other operations that may be performed, are described herein. Further variations may be or become apparent.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

EXAMPLE EMBODIMENTS

The following provides a non-limiting list of example embodiments of the present disclosure:

Example Embodiment 1

A method comprising:
transmitting, from a network element in a communication network to a user equipment (UE), parameters that allow the UE to uniquely determine a UE-specific tracking sequence and assigned time-frequency (TF) resource, the UE-specific tracking sequence and assigned TF resource being independent of a transmit-receive point identifier (TRP ID) associated with the network element; and
receiving, at the network element from the UE operating in a connected inactive operating mode, a tracking signal comprising the UE-specific tracking sequence in accordance with the assigned TF resource.

Example Embodiment 2

The method of Example embodiment 1, further comprising:
detecting the UE in accordance with the UE-specific tracking sequence to produce a UE detection status; and
transmitting, from the network element to the UE, a tracking response in accordance with the UE detection status.

Example Embodiment 3

The method of Example embodiment 2, wherein the tracking response comprises at least one of timing advance information and power control information.

Example Embodiment 4

The method of Example embodiment 2, wherein detecting the UE comprises jointly detecting the UE with at least one other network element.

Example Embodiment 5

The method of Example embodiment 1, wherein transmitting parameters that allow the UE to uniquely determine the UE-specific tracking sequence and assigned TF resource comprises transmitting a UE identifier (ID).

Example Embodiment 6

The method of Example embodiment 5, further comprising:
determining a cyclic shift;
determining a root; and
mapping the cyclic shift and the root to the UE ID.

Example Embodiment 7

The method of Example embodiment 5, wherein the UE ID comprises at least one of a UE type, a zone, location information, and an identifier.

Example Embodiment 8

The method of any one of Example embodiments 1 to 7, further comprising transmitting, from the network element to the UE, information indicating an assigned tracking signal format that is one of a plurality of different tracking signal formats, wherein receiving the tracking signal comprises receiving the tracking signal in accordance with the assigned tracking signal format.

Example Embodiment 9

The method of Example embodiment 8, further comprising selecting, at the network element, the assigned tracking signal format from among the plurality of different tracking signal formats based in part on at least one of:
a deployment scenario;
a characteristic of the UE;
a target tracking performance criterion;
a frame structure;
uplink/downlink duplexing strategy.

Example Embodiment 10

The method of Example embodiment 8 or 9, wherein the different tracking signal formats differ in at least one of:
signal bandwidth;
tracking sequence length;
cyclic prefix;
guard time;
numerologies.

Example Embodiment 11

The method of any one of Example embodiments 1 to 10, further comprising transmitting, from the network element to another UE, parameters that allow the other UE to uniquely determine another UE-specific tracking sequence and assigned TF resource, wherein the two UEs are in a hyper cell and the two UE-specific tracking sequences are non-orthogonal.

Example Embodiment 12

The method of Example embodiment 10, wherein the UE-specific tracking sequences are Zadoff-Chu sequences.

Example Embodiment 13

A method comprising:
receiving, at a network element in a communication network, a tracking signal from a user equipment (UE) that is operating in a connected inactive operating mode, the tracking signal comprising a tracking sequence and having an assigned tracking signal format that is any one of a plurality of different tracking signal formats;
detecting the UE in accordance with the tracking sequence and the assigned tracking signal format to produce a UE detection status.

Example Embodiment 14

The method of Example embodiment 13, further comprising:
transmitting, from the network element to the UE, a tracking response in accordance with the UE detection status.

Example Embodiment 15

The method of Example embodiment 26, wherein the tracking response comprises at least one of timing advance information and power control information.

Example Embodiment 16

The method of Example embodiment 26, wherein detecting the UE comprises jointly detecting the UE with at least one other network element.

Example Embodiment 17

The method of any one of Example embodiments 13 to 16, wherein the different tracking signal formats differ in at least one of:
signal bandwidth;
tracking sequence length;
cyclic prefix;
guard time;
numerologies.

Example Embodiment 18

The method of any one of Example embodiments 13 to 17, further comprising:
assigning the UE a different one of the plurality of tracking signal formats to accommodate at least one of:
a different timing advance mechanism;
a different deployment scenario;
a change in the UE's condition;
a different target tracking performance criterion;
a different frame structure;
a different uplink/downlink duplexing strategy.

Example Embodiment 19

A method that combines any two or more of the network/TRP methods according to example embodiments 1 to 18.

Example Embodiment 20

A network element comprising:
a memory storage comprising instructions; and
one or more processors in communication with the memory storage, wherein the one or more processors execute the instructions to:
transmit parameters to a user equipment (UE) that allow the UE to uniquely determine a UE-specific tracking sequence and assigned time-frequency (TF) resource, the UE-specific tracking sequence and assigned TF resource being independent of a transmit-receive point identifier (TRP ID) associated with the network element; and
receive, from the UE operating in a connected inactive operating mode, a tracking signal comprising the UE-specific tracking sequence in accordance with the assigned TF resource.

Example Embodiment 21

The network element of Example embodiment 20, wherein the one or more processors execute the instructions to:
detect the UE in accordance with the UE-specific tracking sequence to produce a UE detection status; and
transmit, from the network element to the UE, a tracking response in accordance with the UE detection status.

Example Embodiment 22

The network element of Example embodiment 21, wherein the tracking response comprises at least one of timing advance information and power control information.

Example Embodiment 23

The network element of Example embodiment 21, wherein detecting the UE comprises jointly detecting the UE with at least one other network element.

Example Embodiment 24

The network element of Example embodiment 20, wherein transmitting parameters that allow the UE to uniquely determine the UE-specific tracking sequence and assigned TF resource comprises transmitting a UE identifier (ID).

Example Embodiment 25

The network element of Example embodiment 24, wherein the one or more processors execute the instructions to:
determine a cyclic shift;
determine a root; and
map the cyclic shift and the root to the UE ID.

Example Embodiment 26

The method of Example embodiment 24, wherein the UE ID comprises at least one of a UE type, a zone, location information, and an identifier.

Example Embodiment 27

The network element of any one of Example embodiments 20 to 26, wherein the one or more processors execute the instructions to transmit information indicating an assigned tracking signal format that is one of a plurality of different tracking signal formats, wherein receiving the tracking signal comprises receiving the tracking signal in accordance with the assigned tracking signal format.

Example Embodiment 28

The network element of Example embodiment 27, wherein the one or more processors execute the instructions to select, at the network element, the assigned tracking signal format from among the plurality of different tracking signal formats based in part on at least one of:
 a deployment scenario;
 a characteristic of the UE;
 a target tracking performance criterion;
 a frame structure;
 uplink/downlink duplexing strategy.

Example Embodiment 29

The network element of Example embodiment 27 or 28, wherein the different tracking signal formats differ in at least one of:
 signal bandwidth;
 tracking sequence length;
 cyclic prefix;
 guard time;
 numerologies.

Example Embodiment 30

The network element of any one of Example embodiments 20 to 29, wherein the one or more processors execute the instructions to transmit, to another UE, parameters that allow the other UE to uniquely determine another UE-specific tracking sequence and assigned TF resource, wherein the two UEs are in a hyper cell and the two UE-specific tracking sequences are non-orthogonal.

Example Embodiment 31

The network element of Example embodiment 30, wherein the UE-specific tracking sequences are Zadoff-Chu sequences.

Example Embodiment 32

A network element comprising:
 a memory storage comprising instructions; and
 one or more processors in communication with the memory storage, wherein the one or more processors execute the instructions to:
  receive a tracking signal from a user equipment (UE) that is operating in a connected inactive operating mode, the tracking signal comprising a tracking sequence and having an assigned tracking signal format that is any one of a plurality of different tracking signal formats;
  detect the UE in accordance with the tracking sequence and the assigned tracking signal format to produce a UE detection status.

Example Embodiment 33

The network element of Example embodiment 32, wherein the one or more processors execute the instructions to:
 transmit, to the UE, a tracking response in accordance with the UE detection status.

Example Embodiment 34

The network element of Example embodiment 33, wherein the tracking response comprises at least one of timing advance information and power control information.

Example Embodiment 35

The network element of Example embodiment 33, wherein detecting the UE comprises jointly detecting the UE with at least one other network element.

Example Embodiment 36

The network element of any one of Example embodiments 32 to 35, wherein the different tracking signal formats differ in at least one of:
 signal bandwidth;
 tracking sequence length;
 cyclic prefix;
 guard time;
 numerologies.

Example Embodiment 37

The network element of any one of Example embodiments 32 to 36, wherein the one or more processors execute the instructions to:
 assign the UE a different one of the plurality of tracking signal formats to accommodate at least one of:
 a different timing advance mechanism;
 a different deployment scenario;
 a change in the UE's condition;
 a different target tracking performance criterion;
 a different frame structure;
 a different uplink/downlink duplexing strategy.

Example Embodiment 38

A method comprising:
 receiving, at a user equipment (UE) from a network element in a communication network, parameters for allowing the UE to uniquely determine a UE-specific tracking sequence and assigned time-frequency (TF) resource, the UE-specific tracking sequence and assigned TF resource are independent of a transmit-receive point identifier (TRP ID) associated with the network element;
 deriving, at the UE, the UE-specific tracking sequence and assigned TF resource based at least in part on the parameters received from the network element; and
 transmitting, from the UE operating in a connected inactive operating mode, a tracking signal comprising the UE-specific tracking sequence in accordance with the assigned TF resource.

Example Embodiment 39

The method of Example embodiment 38, further comprising receiving, by the UE from the network element, a tracking response after transmitting the tracking signal.

Example Embodiment 40

The method of Example embodiment 39, wherein the tracking response comprises at least one of time advance information and power control information.

Example Embodiment 41

The method of Example embodiment 40, wherein the UE-specific tracking sequence is not associated with the network element.

Example Embodiment 42

The method of Example embodiment 38, wherein transmitting the tracking signal in the connected inactive operating mode comprises transmitting the tracking signal periodically, on demand, or a combination thereof.

Example Embodiment 43

The method of Example embodiment 42, further comprising receiving, by the UE from the network element, information indicating a period for transmitting the tracking signal.

Example Embodiment 44

The method of Example embodiment 38, wherein:
receiving parameters for allowing the UE to uniquely determine the UE-specific tracking sequence and assigned TF resource comprises receiving, by the UE from the network element, a UE identifier (ID); and
deriving the UE-specific tracking sequence and assigned TF resource comprises determining the UE-specific tracking sequence and assigned TF resource based at least in part on the UE ID.

Example Embodiment 45

The method of Example embodiment 44, wherein the UE ID comprises at least one of a UE type, a zone, location information, and an identifier.

Example Embodiment 46

The method of Example embodiment 44, wherein the UE is associated with a hyper cell.

Example Embodiment 47

The method of Example embodiment 46, wherein deriving the UE-specific tracking sequence and assigned TF resource comprises determining the UE-specific tracking sequence and assigned TF resource based at least in part on the UE ID and a hyper cell ID associated with the hyper cell.

Example Embodiment 48

The method of any one of Example embodiments 38 to 44, wherein deriving the UE-specific tracking sequence and assigned TF resource comprises determining the UE-specific tracking sequence and assigned TF resource based at least in part on one or more of the following:
a UE ID associated with the UE;
a seed value for a pseudo random number generator;
a hyper cell ID associated with a hyper cell that is associated with the UE;
a security key;
a time instant.

Example Embodiment 49

The method of any one of Example embodiments 38 to 48, wherein the UE-specific tracking sequence is a Zadoff-Chu sequence.

Example Embodiment 50

A method comprising:
transmitting, from a user equipment (UE) operating in a connected inactive operating mode to a network element in a communication network, a tracking signal comprising a tracking sequence and having an assigned tracking signal format that is any one of a plurality of different tracking signal formats.

Example Embodiment 51

The method of Example embodiment 50, further comprising:
receiving, at the UE, a tracking response from the network element.

Example Embodiment 52

The method of Example embodiment 51, wherein the tracking response comprises at least one of timing advance information and power control information.

Example Embodiment 53

The method of Example embodiment 52, further comprising adjusting, at the UE, at least one of timing advance and transmit power control of the UE based on the tracking response.

Example Embodiment 54

The method of any one of Example embodiments 51 to 53, further comprising receiving, at the UE, at least one other tracking response from at least one other network element that jointly detected the UE's tracking signal.

Example Embodiment 55

The method of any one of Example embodiments 50 to 54, wherein the different tracking signal formats differ in at least one of:
signal bandwidth;
tracking sequence length;
cyclic prefix;
guard time;
numerologies.

Example Embodiment 56

The method of any one of Example embodiments 50 to 55 further comprising transmitting, from the UE operating in the connected inactive operating mode, another tracking signal comprising a tracking sequence and having a different one of the plurality of different tracking signal formats.

Example Embodiment 57

The method of Example embodiment 56, wherein the different one of the plurality of different tracking signal formats accommodates at least one of:

a different timing advance mechanism;
a different deployment scenario;
a change in the UE's condition;
a different target tracking performance criterion;
a different frame structure;
a different uplink/downlink duplexing strategy.

Example Embodiment 58

A method that combines any two or more of the UE methods according to example embodiments 38 to 57.

Example Embodiment 59

A user equipment (UE) comprising:
a memory storage comprising instructions; and
one or more processors in communication with the memory storage, wherein the one or more processors execute the instructions to:
receive, from a network element in a communication network, parameters for allowing the UE to uniquely determine a UE-specific tracking sequence and assigned time-frequency (TF) resource, the UE-specific tracking sequence and assigned TF resource are independent of a transmit-receive point identifier (TRP ID) associated with the network element;
derive, at the UE, the UE-specific tracking sequence and assigned TF resource based at least in part on the parameters received from the network element; and
transmit, from the UE operating in a connected inactive operating mode, a tracking signal comprising the UE-specific tracking sequence in accordance with the assigned TF resource.

Example Embodiment 60

The UE of Example embodiment 59, wherein the one or more processors execute the instructions to receive, from the network element, a tracking response after transmitting the tracking signal.

Example Embodiment 61

The UE of Example embodiment 60, wherein the tracking response comprises at least one of time advance information and power control information.

Example Embodiment 62

The UE of Example embodiment 61, wherein the UE-specific tracking sequence is not associated with the network element.

Example Embodiment 63

The UE of Example embodiment 59, wherein transmitting the tracking signal in the connected inactive operating mode comprises transmitting the tracking signal periodically, on demand, or a combination thereof.

Example Embodiment 64

The UE of Example embodiment 63, wherein the one or more processors execute the instructions to receive, from the network element, information indicating a period for transmitting the tracking signal.

Example Embodiment 65

The UE of Example embodiment 59, wherein:
receiving parameters for allowing the UE to uniquely determine a UE-specific tracking sequence and assigned time-frequency (TF) resource comprises receiving, by the UE from the network element, a UE identifier (ID); and
deriving the UE-specific tracking sequence and assigned TF resource comprises determining the UE-specific tracking sequence and assigned TF resource based at least in part on the UE ID.

Example Embodiment 66

The UE of Example embodiment 65, wherein the UE ID comprises at least one of a UE type, a zone, location information, and an identifier.

Example Embodiment 67

The UE of Example embodiment 65, wherein the UE is associated with a hyper cell.

Example Embodiment 68

The UE of Example embodiment 67, wherein determining the UE-specific tracking sequence and assigned TF resource based at least in part on the UE ID comprises determining the UE-specific tracking sequence and assigned TF resource based at least in part on the UE ID and a hyper cell ID associated with the hyper cell.

Example Embodiment 69

The UE of any one of Example embodiments 59 to 65, wherein deriving the UE-specific tracking sequence and assigned TF resource comprises determining the UE-specific tracking sequence and assigned TF resource based at least in part on one or more of the following:
a UE ID associated with the UE;
a seed value for a pseudo random number generator;
a hyper cell ID associated with a hyper cell that is associated with the UE;
a security key;
a time instant.

Example Embodiment 70

The UE of any one of Example embodiments 59 to 69, wherein the UE-specific tracking sequence is a Zadoff-Chu sequence.

Example Embodiment 71

A user equipment (UE) comprising:
a memory storage comprising instructions; and
one or more processors in communication with the memory storage, wherein the one or more processors execute the instructions to:
transmit, from the UE operating in a connected inactive operating mode to a network element in a communication network, a tracking signal comprising a tracking sequence and having an assigned tracking signal format that is any one of a plurality of different tracking signal formats.

Example Embodiment 72

The UE of Example embodiment 71, wherein the one or more processors execute the instructions to receive a tracking response from the network element.

Example Embodiment 73

The UE of Example embodiment 72, wherein the tracking response comprises at least one of timing advance information and power control information.

Example Embodiment 74

The UE of Example embodiment 73, wherein the one or more processors execute the instructions to adjust at least one of timing advance and transmit power control of the UE based on the tracking response.

Example Embodiment 75

The UE of any one of Example embodiments 72 to 74, wherein the one or more processors execute the instructions to receive at least one other tracking response from at least one other network element that jointly detected the UE's tracking signal.

Example Embodiment 76

The UE of any one of Example embodiments 71 to 75, wherein the different tracking signal formats differ in at least one of:
    signal bandwidth;
    tracking sequence length;
    cyclic prefix;
    guard time;
    numerologies.

Example Embodiment 77

The UE of any one of Example embodiments 71 to 76, wherein the one or more processors execute the instructions to transmit, from the UE operating in the connected inactive operating mode, another tracking signal comprising a tracking sequence and having a different one of the plurality of different tracking signal formats.

Example Embodiment 78

The UE of Example embodiment 77, wherein the different one of the plurality of different tracking signal formats accommodates at least one of:
    a different timing advance mechanism;
    a different deployment scenario;
    a change in the UE's condition;
    a different target tracking performance criterion;
    a different frame structure;
    a different uplink/downlink duplexing strategy.

Example Embodiment 79

A network element or group of network elements configured to implement the method of any one of Example embodiments 1 to 19.

Example Embodiment 80

A UE configured to implement the method of any one of Example embodiments 38 to 58.

The contents of the drawings are intended solely for illustrative purposes, and the present invention is in no way limited to the particular example embodiments explicitly shown in the drawings and described herein. For example, FIG. 1 is a block diagram of a communication system in which embodiments may be implemented. Other embodiments could be implemented in communication systems that include more network elements than shown, or that have different topologies than the example shown. Similarly, the examples in FIGS. 2 to 18 are also intended solely for illustrative purposes.

Other implementation details could also vary between different embodiments. For example, some of the examples above refer to LTE and NR terminology. However, the embodiments disclosed herein are not in any way limited to LTE/NR systems. RRC idle mode is an example of a standby operating mode in LTE systems. Standby operating modes in other types of systems include Sleep mode and DRx (Discontinuous reception) mode, for instance.

In addition, although described primarily in the context of methods and systems, other implementations are also contemplated, as instructions stored on a non-transitory processor-readable medium, for example. The instructions, when executed by one or more processors, cause the one or more processors to perform a method.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A method comprising:
    transmitting, from a transmit-receive point (TRP) in a communication network to a first user equipment (UE), parameters that include a first UE identifier (ID) associated with the first UE and allow the first UE to uniquely determine a first UE-specific tracking sequence and first assigned time-frequency (TF) resource, the first UE-specific tracking sequence and first assigned TF resource being determined based on the first UE ID and independent of a transmit-receive point identifier (TRP ID) associated with the TRP;
    receiving, at the TRP from the first UE, a tracking signal comprising the first UE-specific tracking sequence in accordance with the first assigned TF resource; and
    transmitting, from the TRP to a second UE, parameters that include a second UE ID associated with the second UE and allow the second UE to uniquely determine a second UE-specific tracking sequence and second assigned TF resource, the second UE-specific tracking sequence and second assigned TF resource being determined based on the second UE ID and independent of the TRP ID associated with the TRP, wherein the two UEs are in a hyper cell and the two UE-specific tracking sequences are non-orthogonal.

2. The method of claim 1, further comprising:
detecting the first UE in accordance with the first UE-specific tracking sequence to produce a UE detection status; and
transmitting, from the TRP to the first UE, a tracking response in accordance with the UE detection status.

3. The method of claim 2, wherein the tracking response comprises at least one of an acknowledgement that the first UE is detected, timing advance information or power control information.

4. The method of claim 2, wherein detecting the first UE comprises jointly detecting the first UE with at least one other TRP.

5. The method of claim 1, wherein the parameters further include one or more of the following:
a seed value for a pseudo random number generator;
a hyper cell ID associated with the hyper cell that is associated with the first UE; or
a security key.

6. The method of claim 5, further comprising:
determining a cyclic shift;
determining a root; and
mapping the cyclic shift and the root to the UE ID.

7. The method of claim 1, further comprising transmitting, from the TRP to the first UE, information indicating an assigned tracking signal format that is one of a plurality of different tracking signal formats, wherein receiving the tracking signal comprises receiving the tracking signal in accordance with the assigned tracking signal format.

8. The method of claim 7, further comprising selecting, at the TRP, the assigned tracking signal format from among the plurality of different tracking signal formats based in part on at least one of:
a deployment scenario;
a characteristic of the first UE;
a target tracking performance criterion;
a frame structure; or
uplink/downlink duplexing strategy.

9. A transmit-receive point (TRP) comprising:
a memory storage comprising instructions; and
one or more processors in communication with the memory storage, wherein the one or more processors execute the instructions to:
transmit, to a first user equipment (UE), parameters that include a first UE identifier (ID) associated with the first UE and allow the first UE to uniquely determine a first UE-specific tracking sequence and first assigned time-frequency (TF) resource, the first UE-specific tracking sequence and first assigned TF resource being determined based on the first UE ID and independent of a transmit-receive point identifier (TRP ID) associated with the TRP;
receive, from the first UE, a tracking signal comprising the first UE-specific tracking sequence in accordance with the first assigned TF resource; and
transmit, to a second UE, parameters that include a second UE ID associated with the second UE and allow the second UE to uniquely determine a second UE-specific tracking sequence and second assigned TF resource, the second UE-specific tracking sequence and second assigned TF resource being determined based on the second UE ID and independent of the TRP ID associated with the TRP, wherein the two UEs are in a hyper cell and the two UE-specific tracking sequences are non-orthogonal.

10. The network element of claim 9, wherein the one or more processors execute the instructions to:
detect the first UE in accordance with the first UE-specific tracking sequence to produce a UE detection status; and
transmit, from the TRP to the first UE, a tracking response in accordance with the UE detection status.

11. The TRP of claim 9, wherein the parameters further include one or more of the following:
a seed value for a pseudo random number generator;
a hyper cell ID associated with the hyper cell that is associated with the first UE; or
a security key.

12. The TRP of claim 9, wherein the one or more processors execute the instructions to transmit information indicating an assigned tracking signal format that is one of a plurality of different tracking signal formats, wherein receiving the tracking signal comprises receiving the tracking signal in accordance with the assigned tracking signal format.

13. The TRP of claim 12, wherein the one or more processors execute the instructions to select, at the TRP, the assigned tracking signal format from among the plurality of different tracking signal formats based in part on at least one of:
a deployment scenario;
a characteristic of the first UE;
a target tracking performance criterion;
a frame structure; or
uplink/downlink duplexing strategy.

14. A method comprising:
receiving, at a user equipment (UE) from a transmit-receive point (TRP) in a communication network, parameters that include a first UE identifier (ID) associated with the UE and for allowing the UE to uniquely determine a UE-specific tracking sequence and assigned time-frequency (TF) resource;
determining, at the UE, the UE-specific tracking sequence and assigned TF resource based on the UE ID, the UE-specific tracking sequence and assigned TF resource are independent of a transmit-receive point identifier (TRP ID) associated with the TRP;
transmitting, from the UE, a tracking signal comprising the UE-specific tracking sequence in accordance with the assigned TF resource; and
identifying at least one uplink (UL) receive (Rx) antenna beam of the TRP based on: a known reciprocity of the TRP; and at least one downlink (DL) transmission (Tx) antenna beam of the TRP that the UE previously identified as being the Tx side of an optimal beam pair link (BPL) for DL reception;
wherein transmitting the tracking signal from the UE comprises sequentially transmitting the tracking signal on each UL Tx antenna beam of the UE when the TRP is scheduled to listen on the at least one identified UL Rx antenna beam.

15. The method of claim 14, further comprising receiving, by the UE from the TRP, a tracking response after transmitting the tracking signal.

16. The method of claim 15, wherein the tracking response comprises at least one of an acknowledgement that the UE is detected, time advance information or power control information.

17. The method of claim 14, wherein transmitting the tracking signal comprises transmitting the tracking signal periodically, on demand, or a combination thereof.

18. The method of claim 14, wherein the parameters further include one or more of the following:

a seed value for a pseudo random number generator;
a hyper cell ID associated with a hyper cell that is associated with the UE; or
a security key.

19. The method of claim 14, wherein:
there is a mapping between TF resources for UL tracking signal transmission and DL Tx antenna beams; and
sequentially transmitting the tracking signal on each UL Tx antenna beam of the UE when the TRP is scheduled to listen on the at least one identified UL Rx antenna beam comprises sequentially transmitting the tracking signal on the TF resource(s) corresponding to the at least one DL Tx antenna beam of the TRP that the UE previously identified as being the Tx side of an optimal BPL for DL reception.

20. A user equipment (UE) comprising:
a memory storage comprising instructions; and
one or more processors in communication with the memory storage, wherein the one or more processors execute the instructions to:
receive, from a transmit-receive point (TRP) in a communication network, parameters that include a UE identifier (ID) associated with the UE and for allowing the UE to uniquely determine a UE-specific tracking sequence and assigned time-frequency (TF) resource;
determine, at the UE, the UE-specific tracking sequence and assigned TF resource based on the UE ID, the UE-specific tracking sequence and assigned TF resource are independent of a transmit-receive point identifier (TRP ID) associated with the TRP;
transmit, from the UE, a tracking signal comprising the UE-specific tracking sequence in accordance with the assigned TF resource; and
identify at least one uplink (UL) receive (Rx) antenna beam of the TRP based on: a known reciprocity of the TRP; and at least one downlink (DL) transmission (Tx) antenna beam of the TRP that the UE previously identified as being the Tx side of an optimal beam pair link (BPL) for DL reception; and
sequentially transmit, from the UE, the tracking signal on each UL Tx antenna beam of the UE when the TRP is scheduled to listen on the at least one identified UL Rx antenna beam.

21. The UE of claim 20, wherein the one or more processors execute the instructions to receive, from the TRP, a tracking response after transmitting the tracking signal.

22. The UE of claim 20, wherein transmitting the tracking signal comprises transmitting the tracking signal periodically, on demand, or a combination thereof.

23. The UE of claim 20, wherein the parameters include one or more of the following:
a seed value for a pseudo random number generator;
a hyper cell ID associated with a hyper cell that is associated with the UE; or
a security key.

24. The UE of claim 20, wherein:
there is a mapping between TF resources for UL tracking signal transmission and DL Tx antenna beams; and
the one or more processors execute the instructions to sequentially transmit the tracking signal on the TF resource(s) corresponding to the at least one DL Tx antenna beam of the TRP that the UE previously identified as being the Tx side of an optimal BPL for DL reception.

* * * * *